(12) United States Patent
Billow

(10) Patent No.: US 12,311,680 B2
(45) Date of Patent: May 27, 2025

(54) MODIFYING IMAGE DATA TO COMPENSATE FOR DEFECTIVE PRINTER NOZZLES

(71) Applicant: Electronics for Imaging, Inc., Londonberry, NH (US)

(72) Inventor: Steven Billow, Bow, NH (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

(21) Appl. No.: 18/320,107

(22) Filed: May 18, 2023

(65) Prior Publication Data

US 2023/0286290 A1 Sep. 14, 2023

Related U.S. Application Data

(60) Continuation of application No. 17/196,962, filed on Mar. 9, 2021, now Pat. No. 11,691,437, which is a division of application No. 16/709,744, filed on Dec. 10, 2019, now Pat. No. 10,953,665, which is a continuation of application No. 15/636,320, filed on Jun. 28, 2017, now Pat. No. 10,507,670.

(60) Provisional application No. 62/360,246, filed on Jul. 8, 2016.

(51) Int. Cl.
*B41J 2/465* (2006.01)
*B41J 2/045* (2006.01)
*B41J 2/21* (2006.01)

(52) U.S. Cl.
CPC ............. *B41J 2/465* (2013.01); *B41J 2/0451* (2013.01); *B41J 2/0458* (2013.01); *B41J 2/04581* (2013.01); *B41J 2/2139* (2013.01); *B41J 2/2142* (2013.01); *B41J 2/2146* (2013.01)

(58) Field of Classification Search
CPC ........ B41J 2/465; B41J 2/0451; B41J 2/0458; B41J 2/04581; B41J 2/2139; B41J 2/2142; B41J 2/2146
See application file for complete search history.

(56) References Cited

U.S. PATENT DOCUMENTS

| | | | |
|---|---|---|---|
| 10,507,670 B2 * | 12/2019 | Billow | ................... B41J 2/0451 |
| 10,953,665 B2 * | 3/2021 | Billow | ..................... B41J 19/14 |
| 2002/0196484 A1 | 12/2002 | Chang et al. | |
| 2005/0105105 A1 | 5/2005 | Vestjens et al. | |
| 2005/0116981 A1 | 6/2005 | Faken et al. | |
| 2007/0211101 A1 | 9/2007 | Yamanobe | |
| 2014/0022295 A1 | 1/2014 | Metcalfe et al. | |

(Continued)

FOREIGN PATENT DOCUMENTS

| | | |
|---|---|---|
| CN | 1939729 A | 4/2007 |
| CN | 1948010 A | 4/2007 |

(Continued)

*Primary Examiner* — Geoffrey S Mruk
(74) *Attorney, Agent, or Firm* — Perkins Coie LLP

(57) ABSTRACT

The disclosed embodiments include a method to compensate for defective printer nozzles. The method can include detecting a defective printer nozzle and initiating a print job including image data of the defective printer nozzle for a pixel location of an image. The image is to be printed in accordance with a print mask that maps printer nozzles to pixel locations of the image. The method can include modifying the image to print the image data in a neighboring pixel location relative to the pixel location of the image and printing the modified image.

11 Claims, 16 Drawing Sheets

(56) References Cited

U.S. PATENT DOCUMENTS

| | | | |
|---|---|---|---|
| 2015/0360491 A1 | 12/2015 | Billow et al. | |
| 2015/0375500 A1 | 12/2015 | Sato et al. | |
| 2016/0144613 A1 | 5/2016 | Fukazawa et al. | |
| 2017/0190190 A1* | 7/2017 | Yoshikawa | B41J 2/2132 |

FOREIGN PATENT DOCUMENTS

| | | |
|---|---|---|
| JP | 2005104037 A | 4/2005 |
| JP | 2016000398 A | 1/2016 |

* cited by examiner

NOZZLE MAP

| | P₁ (O) | P₂ (O) | P₃ (E) | P₄ (E) | P₅ (O) | P₆ (O) | P₇ (E) | P₈ (E) |
|---|---|---|---|---|---|---|---|---|
| R₁ | N₁ | | | | | | | |
| R₂ | | | | | | | | |
| R₃ | N₂ | | | | | | | |
| R₄ | | N₁ | | | | | | |
| R₅ | N₃ | | | | | | | |
| R₆ | | N₂ | | | | | | |
| R₇ | N₄ | | N₁ | | | | | |
| R₈ | | N₃ | | | | | | |
| R₉ | N₅ | | N₂ | | | | | |
| R₁₀ | | N₄ | | N₁ | | | | |
| R₁₁ | N₆ | | N₃ | | | | | |
| R₁₂ | | N₅ | | N₂ | | | | |
| R₁₃ | | | N₄ | | N₁ | | | |
| R₁₄ | | N₆ | | N₃ | | | | |
| R₁₅ | | | N₅ | | N₂ | | | |
| R₁₆ | | | | N₄ | | N₁ | | |
| R₁₇ | | | N₆ | | N₃ | | | |
| R₁₈ | | | | N₅ | | N₂ | | |
| R₁₉ | | | | | N₄ | | N₁ | |
| R₂₀ | | | | N₆ | | N₃ | | |
| R₂₁ | | | | | N₅ | | N₂ | |
| R₂₂ | | | | | | N₄ | | N₁ |
| R₃₃ | | | | | N₆ | | N₃ | |
| R₂₄ | | | | | | N₅ | | N₂ |
| R₂₅ | | | | | | | N₄ | |
| R₂₆ | | | | | | N₆ | | N₃ |
| R₂₇ | | | | | | | N₅ | |
| R₂₈ | | | | | | | | N₄ |
| R₂₉ | | | | | | | N₆ | |
| R₃₀ | | | | | | | | N₅ |
| R₃₁ | | | | | | | | |
| R₃₂ | | | | | | | | N₆ |

$P_X$ = PASS (X)
$N_Y$ = NOZZLE (Y)
$R_j$ = RASTER ROW (j)
$C_i$ = RASTER COLUMN (i)
O = ODD
E = EVEN

*FIG. 3A*

IMAGE BUILD

| | C$_1$ (O) | C$_2$ (E) | C$_3$ (O) | C$_4$ (E) | C$_5$ (O) | C$_6$ (E) | C$_7$ (O) | C$_8$ (E) | C$_9$ (O) |
|---|---|---|---|---|---|---|---|---|---|
| R$_1$ | [P$_1$, N$_1$] | | [P$_1$, N$_1$] | | [P$_1$, N$_1$] | | [P$_1$, N$_1$] | | [P$_1$, N$_1$] |
| R$_2$ | | | | | | | | | |
| R$_3$ | [P$_1$, N$_2$] | | [P$_1$, N$_2$] | | [P$_1$, N$_2$] | | [P$_1$, N$_2$] | | [P$_1$, N$_2$] |
| R$_4$ | [P$_2$, N$_1$] | | [P$_2$, N$_1$] | | [P$_2$, N$_1$] | | [P$_2$, N$_1$] | | [P$_2$, N$_1$] |
| R$_5$ | [P$_1$, N$_3$] | | [P$_1$, N$_3$] | | [P$_1$, N$_3$] | | [P$_1$, N$_3$] | | [P$_1$, N$_3$] |
| R$_6$ | [P$_2$, N$_2$] | | [P$_2$, N$_2$] | | [P$_2$, N$_2$] | | [P$_2$, N$_2$] | | [P$_2$, N$_2$] |
| R$_7$ | [P$_1$, N$_4$] | [P$_3$, N$_1$] | [P$_1$, N$_4$] | [P$_3$, N$_1$] | [P$_1$, N$_4$] | [P$_3$, N$_1$] | [P$_1$, N$_4$] | [P$_3$, N$_1$] | [P$_1$, N$_4$] |
| R$_8$ | [P$_2$, N$_3$] | | [P$_2$, N$_3$] | | [P$_2$, N$_3$] | | [P$_2$, N$_3$] | | [P$_2$, N$_3$] |
| R$_9$ | [P$_1$, N$_5$] | [P$_3$, N$_2$] | [P$_1$, N$_5$] | [P$_3$, N$_2$] | [P$_1$, N$_5$] | [P$_3$, N$_2$] | [P$_1$, N$_5$] | [P$_3$, N$_2$] | [P$_1$, N$_5$] |
| R$_{10}$ | [P$_2$, N$_4$] | [P$_4$, N$_1$] | [P$_2$, N$_4$] | [P$_4$, N$_1$] | [P$_2$, N$_4$] | [P$_4$, N$_1$] | [P$_2$, N$_4$] | [P$_4$, N$_1$] | [P$_2$, N$_4$] |
| R$_{11}$ | [P$_1$, N$_6$] | [P$_3$, N$_3$] | [P$_1$, N$_6$] | [P$_3$, N$_3$] | [P$_1$, N$_6$] | [P$_3$, N$_3$] | [P$_1$, N$_6$] | [P$_3$, N$_3$] | [P$_1$, N$_6$] |
| R$_{12}$ | [P$_2$, N$_5$] | [P$_4$, N$_2$] | [P$_2$, N$_5$] | [P$_4$, N$_2$] | [P$_2$, N$_5$] | [P$_4$, N$_2$] | [P$_2$, N$_5$] | [P$_4$, N$_2$] | [P$_2$, N$_5$] |
| R$_{13}$ | [P$_5$, N$_1$] | [P$_3$, N$_4$] | [P$_5$, N$_1$] | [P$_3$, N$_4$] | [P$_5$, N$_1$] | [P$_3$, N$_4$] | [P$_5$, N$_1$] | [P$_3$, N$_4$] | [P$_5$, N$_1$] |
| R$_{14}$ | [P$_2$, N$_6$] | [P$_4$, N$_3$] | [P$_2$, N$_6$] | [P$_4$, N$_3$] | [P$_2$, N$_6$] | [P$_4$, N$_3$] | [P$_2$, N$_6$] | [P$_4$, N$_3$] | [P$_2$, N$_6$] |
| R$_{15}$ | [P$_5$, N$_2$] | [P$_3$, N$_5$] | [P$_5$, N$_2$] | [P$_3$, N$_5$] | [P$_5$, N$_2$] | [P$_3$, N$_5$] | [P$_5$, N$_2$] | [P$_3$, N$_5$] | [P$_5$, N$_2$] |
| R$_{16}$ | [P$_6$, N$_1$] | [P$_4$, N$_4$] | [P$_6$, N$_1$] | [P$_4$, N$_4$] | [P$_6$, N$_1$] | [P$_4$, N$_4$] | [P$_6$, N$_1$] | [P$_4$, N$_4$] | [P$_6$, N$_1$] |
| R$_{17}$ | [P$_5$, N$_3$] | [P$_3$, N$_6$] | [P$_5$, N$_3$] | [P$_3$, N$_6$] | [P$_5$, N$_3$] | [P$_3$, N$_6$] | [P$_5$, N$_3$] | [P$_3$, N$_6$] | [P$_5$, N$_3$] |
| R$_{18}$ | [P$_6$, N$_2$] | [P$_4$, N$_5$] | [P$_6$, N$_2$] | [P$_4$, N$_5$] | [P$_6$, N$_2$] | [P$_4$, N$_5$] | [P$_6$, N$_2$] | [P$_4$, N$_5$] | [P$_6$, N$_2$] |
| R$_{19}$ | [P$_5$, N$_4$] | [P$_7$, N$_1$] | [P$_5$, N$_4$] | [P$_7$, N$_1$] | [P$_5$, N$_4$] | [P$_7$, N$_1$] | [P$_5$, N$_4$] | [P$_7$, N$_1$] | [P$_5$, N$_4$] |
| R$_{20}$ | [P$_6$, N$_3$] | [P$_4$, N$_6$] | [P$_6$, N$_3$] | [P$_4$, N$_6$] | [P$_6$, N$_3$] | [P$_4$, N$_6$] | [P$_6$, N$_3$] | [P$_4$, N$_6$] | [P$_6$, N$_3$] |
| R$_{21}$ | [P$_5$, N$_5$] | [P$_7$, N$_2$] | [P$_5$, N$_5$] | [P$_7$, N$_2$] | [P$_5$, N$_5$] | [P$_7$, N$_2$] | [P$_5$, N$_5$] | [P$_7$, N$_2$] | [P$_5$, N$_5$] |
| R$_{22}$ | [P$_6$, N$_4$] | [P$_8$, N$_1$] | [P$_6$, N$_4$] | [P$_8$, N$_1$] | [P$_6$, N$_4$] | [P$_8$, N$_1$] | [P$_6$, N$_4$] | [P$_8$, N$_1$] | [P$_6$, N$_4$] |
| R$_{23}$ | [P$_5$, N$_6$] | [P$_7$, N$_3$] | [P$_5$, N$_6$] | [P$_7$, N$_3$] | [P$_5$, N$_6$] | [P$_7$, N$_3$] | [P$_5$, N$_6$] | [P$_7$, N$_3$] | [P$_5$, N$_6$] |
| R$_{24}$ | [P$_6$, N$_5$] | [P$_8$, N$_2$] | [P$_6$, N$_5$] | [P$_8$, N$_2$] | [P$_6$, N$_5$] | [P$_8$, N$_2$] | [P$_6$, N$_5$] | [P$_8$, N$_2$] | [P$_6$, N$_5$] |
| R$_{25}$ | | [P$_7$, N$_4$] | | [P$_7$, N$_4$] | | [P$_7$, N$_4$] | | [P$_7$, N$_4$] | |
| R$_{26}$ | [P$_6$, N$_6$] | [P$_8$, N$_3$] | [P$_6$, N$_6$] | [P$_8$, N$_3$] | [P$_6$, N$_6$] | [P$_8$, N$_3$] | [P$_6$, N$_6$] | [P$_8$, N$_3$] | [P$_6$, N$_6$] |
| R$_{27}$ | | [P$_7$, N$_5$] | | [P$_7$, N$_5$] | | [P$_7$, N$_5$] | | [P$_7$, N$_5$] | |
| R$_{28}$ | | [P$_8$, N$_4$] | | [P$_8$, N$_4$] | | [P$_8$, N$_4$] | | [P$_8$, N$_4$] | |
| R$_{29}$ | | [P$_7$, N$_6$] | | [P$_7$, N$_6$] | | [P$_7$, N$_6$] | | [P$_7$, N$_6$] | |
| R$_{30}$ | | [P$_8$, N$_5$] | | [P$_8$, N$_5$] | | [P$_8$, N$_5$] | | [P$_8$, N$_5$] | |
| R$_{31}$ | | | | | | | | | |
| R$_{32}$ | | [P$_8$, N$_6$] | | [P$_8$, N$_6$] | | [P$_8$, N$_6$] | | [P$_8$, N$_6$] | |

Rows R$_1$–R$_8$: NOT ACTUALLY PRINTED
Rows R$_9$–R$_{24}$: IMAGE WHERE PRINTING IS COMPLETE
Rows R$_{25}$–R$_{32}$: IMAGE IN PROCESS OF BEING PRINTED P$_X$ = PASS (X)
N$_Y$ = NOZZLE (Y)
R$_j$ = RASTER ROW (j)
C$_i$ = RASTER COLUMN (i)
O = ODD
E = EVEN

*FIG. 3B*

NOZZLE MAP $P_X$ = PASS (X)
$N_Y$ = NOZZLE (Y)
$R_j$ = RASTER ROW (j)
$C_i$ = RASTER COLUMN (i)
O = ODD
E = EVEN

MODIFYING IMAGE DATA TO COMPENSATE FOR DEFECTIVE PRINTER NOZZLES

CROSS-REFERENCE TO RELATED APPLICATIONS

This application is a continuation of U.S. patent application Ser. No. 17/196,962, filed on Mar. 9, 2021, now U.S. Pat. No. 11,691,437, entitled "Modifying Image Data to Compensate for Defective Printer Nozzles," which is a division of U.S. patent application Ser. No. 16/709,744 filed on Dec. 10, 2019, now U.S. Pat. No. 10,953,665, entitled "Modifying Image Data to Compensate for Defective Printer Nozzles," which is a continuation of U.S. patent application Ser. No. 15/636,320 filed on Jun. 28, 2017, now U.S. Pat. No. 10,507,670, entitled "Nozzle Compensation For Shuttle-Based Printers", which claims priority to U.S. Provisional Patent Application No. 62/360,246 filed on Jul. 8, 2016, entitled "Nozzle Compensation For Shuttle-Based Printers", each of which are incorporated herein in their entirety by this reference thereto.

TECHNICAL FIELD

The disclosed teachings generally relate to techniques for compensating for defective printer nozzles. More particularly, the disclosed teachings relate to techniques for compensating for defective printer nozzles in shuttle-based printers.

BACKGROUND

Common types of inkjet printers include single-pass systems and shuttle based systems (i.e., multi-pass systems). FIG. 1A illustrates an example of printing using a single-pass system. The printer includes one or more printheads that span the width of the printer, which is perpendicular to the direction of the paper transport. The printheads can access reservoirs of ink to print an image on media that advances under the printheads in a downstream direction. An image is a perceptible representation (e.g., a document, a banner, or a graphic) that can be recorded (e.g., printed) on media (e.g., physical substrates such as paper or tile). The printheads can dispense different inks to print a colored image on the media.

FIG. 1B illustrates an example of printing using a shuttle based system. As shown, printing involves multiple "passes" of a carriage (not shown) including a printhead that moves perpendicular to the direction that the media advances over a printing area. With each pass, ink can be dispensed onto a medium to print an image. Hence, the carriage can pass the printheads over media multiple times to produce full-color results.

The printheads of inkjet printers eject drops of ink through small openings onto media. These small openings are commonly referred to as ejection nozzles. Each drop of ink forms a printed dot on media. A printed image is formed from numerous pixels that can include printed dots. The nozzles can fail to operate properly when, for example, they become clogged with debris. When this occurs, printing is stopped to clean or replace the defective printer nozzles. Accordingly, existing techniques for correcting for defective printer nozzles are counterproductive and unfit for modern high speed printers.

SUMMARY

Introduced here is at least one method and at least one apparatus to compensate for a defective printer nozzle of an array of nozzles used by a printer to print an image. The at least one method includes detecting defective printer nozzles, and initiating a print job in a print mode. The print job can include image data used to print the image on a medium in accordance with a print mask that maps the printer nozzles to pixel locations of the image. The method further includes modifying the print mask and/or the image data values to print using the image data with printer nozzles that can be complementary to the defective printer nozzles, and printing the image on the medium in accordance with the print mode and the modified print mask or the modified image data values.

Other aspects of the disclosed embodiments will be apparent from the accompanying figures and detailed description.

This Summary is provided to introduce a selection of concepts in a simplified form that is further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3A illustrates a nozzle map for a non-smoothing print mode according to some embodiments of the present disclosure;

FIG. 3B illustrates an image build grid for a 4-pass print mode with no redundancy or smoothing according to some embodiments of the present disclosure;

FIG. 4A illustrates a nozzle map for an 8-pass print mode having some level of redundancy or smoothing according to some embodiments of the present disclosure;

FIG. 4B illustrates an image build grid for a heavy smoothing print mode according to some embodiments of the present disclosure;

DETAILED DESCRIPTION

Figure 1A:
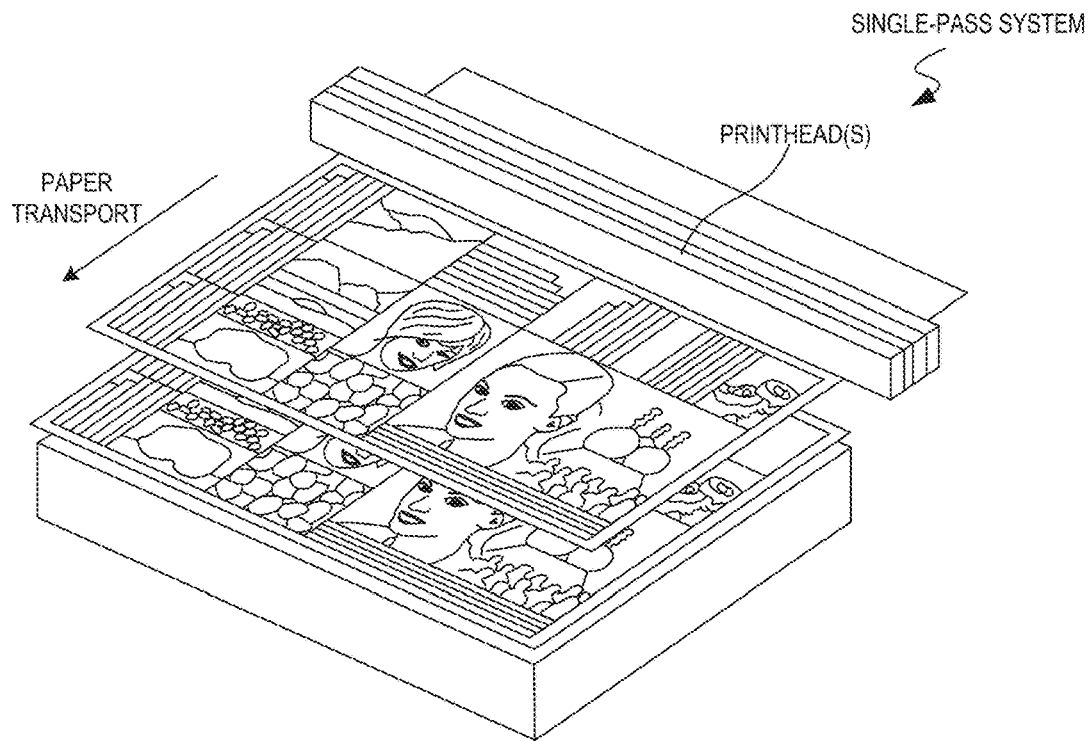
FIG. 1A illustrates an example of printing using a single-pass system.
Figure 1B:
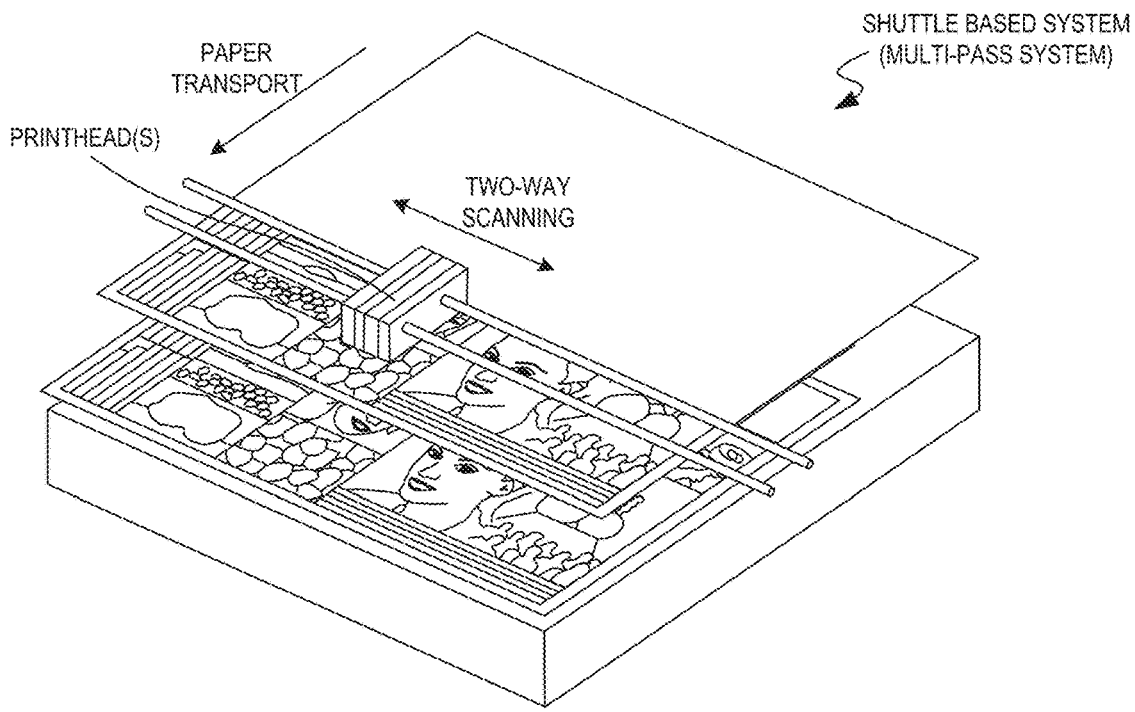
FIG. 1B illustrates an example of printing using a shuttle based system.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, mean any connection or coupling, either direct or indirect, between two or more elements. The coupling or connection between the elements can be physical, logical, or a combination thereof.

The disclosed embodiments concern techniques to compensate for defective printer nozzles in shuttle based systems of inkjet printers. As described in greater detail further below, inkjet printing is a type of computer printing that reproduces digital images by propelling droplets of ink onto paper, tile, plastic, or other tangible media. In particular, an image is formed of pixels that may include dots of different colored inks, and an array of nozzles of the inkjet printer eject the dots of ink in accordance with image data included in a print job generated by a computer. The shuttle based system of the printer passes the nozzles over the media a number of times as they eject ink to form the image.

Inkjet printers have a number of advantages over other types of printers. For example, inkjet printers are quieter in operation than impact dot matrix or daisywheel printers. They can print finer, smoother details (e.g., photographic-quality printing) through higher printhead resolution. That is, the shuttle based printer can use a greater density of nozzles and/or perform multiple passes of the nozzles to achieve a higher resolution. Moreover, inkjets printers require practically no warm up time, are capable of very high speed printing, and have relatively low cost per page compared to other types of printers.

Although using nozzles enables the numerous advantages of inkjet printing, the nozzles are susceptible to malfunctioning or failing. For example, ink contained in the nozzles can dry to harden and plug the passageways of the nozzles. In particular, once ink begins to collect and harden in nozzles, the drop volume of a nozzle can be affected, drop trajectory can change, or the nozzle can completely fail to eject ink. As a result, the nozzle can malfunction or even fail. Thus, a defective printer nozzle does not operate properly to eject suitable amounts of ink on pixel locations of media in accordance with the image data of a print job.

To compensate for these problems, inkjet printers may use techniques such as mechanisms to moisten the nozzles, cover the nozzles, and/or clean the nozzles. Each of these mechanisms has its own disadvantages. For example, routine cleaning requires interrupting printing processes and consumes a substantial amount of ink, which increases the cost per page. The defective printer nozzles can be detected by printing a standard test pattern on a page and manually inspecting the test pattern or automatically inspecting the test pattern by using an imaging system. Thus, existing mechanisms for compensating for defective printer nozzles require halting printing to clean or replace nozzles, which reduces productivity and increases costs. Alternatively, a slower print mode with higher levels of redundancy can be used to lessen the visibility of a defective nozzle. This also has the drawback of significantly reducing the overall output of the printer.

The disclosed techniques overcome these drawbacks by rerouting image data for defective printer nozzles to other nozzles or by modifying image data to compensate for the defective printer nozzles. In some embodiments, the disclosed techniques can use complementary nozzles that fully or partially compensate for the defective printer nozzles. A fully complementary nozzle refers to another nozzle in an array of nozzles that can use image data designated for a defective printer nozzle to print in the same pixel locations that the defective printer nozzle would have printed. As such, a fully complementary nozzle can functionally replace the printing of a failed nozzle.

A partially complementary nozzle is also another nozzle in an array of nozzles of a printhead that includes the defective printer nozzle. However, unlike a fully complementary nozzle, a partially complementary nozzle cannot functionally replace the printing of a failed nozzle by printing in the same pixel locations that the defective printer nozzle would have printed. Instead, image data of a defective printer nozzle can be rerouted to one or more partially complementary nozzles to print in neighboring pixel locations that partially intersect the pixel locations where the defective printer nozzle would have printed.

To maximize productivity, some inkjet printers will move the carriage at a speed such that the product of the carriage speed and the resolution of the print data in that same direction exceeds the maximum firing rate of the print head. While this can increase speed of the printer, it places constraints on what image pixel columns can be addressed by a nozzle during a pass of the carriage. For example, it might be that on some passes nozzles are restricted to printing only every-other raster column. Then, on subsequent passes, the raster columns not printed on the first pass can be addressed. To further illustrate, the nozzles on a given pass may only print the odd-numbered raster columns, while on the next pass the nozzles will be restricted to printing only the even numbered columns. In this manner, it is possible to double the carriage speed compared to the case in which the carriage speed was limited by the product of the maximum nozzle firing rate and the image resolution in the axis of carriage motion.

The disclosed compensation techniques can be arranged in a compensation scheme that uses a combination of fully and/or partially complementary nozzles to compensate for defective printer nozzles in an effective manner without halting printing. For example, a compensation scheme may include a combination of tiers. A first compensation tier may include using fully complementary nozzles to functionally replace defective printer nozzles, when fully complementary nozzles are available. The use of fully complementary nozzles could provide the most effective and straightforward level of compensation for defective printer nozzles.

A printer will typically include different print modes. These print modes may vary many attributes of the printing, including but not limited to changes in color, printing speed, print resolution, or the number of passes used to print the image. In particular, while increasing the number of passes reduces the overall output of the printer, the quality can be improved by making the visual appearance of any defective nozzle less objectionable. By taking more passes over any given raster line, more nozzles can be used to print the image data associated with that raster line. This reduces the number of pixels printed by a defective nozzle, thereby lessening its negative impact on print quality.

For printheads that have a defective printer nozzle while printing in a selected print mode without a fully complementary nozzle, a second compensation tier may involve using one or more partially complementary nozzles to compensate for the defective printer nozzle. Thus, even though it is not always possible to identify another nozzle that can fully compensate a defective printer nozzle, it is still desirable to perform some level of compensation. That is, even if the compensation is not 100% effective, some compensation can still improve print quality. The disclosed techniques may employ any number of additional compensation steps so that each defective printer nozzle can receive some level of compensation regardless of a print mode. Accordingly, the disclosed embodiments can provide multi-tiered processes to implement at least some level of compensation across print modes.

Figure 2:
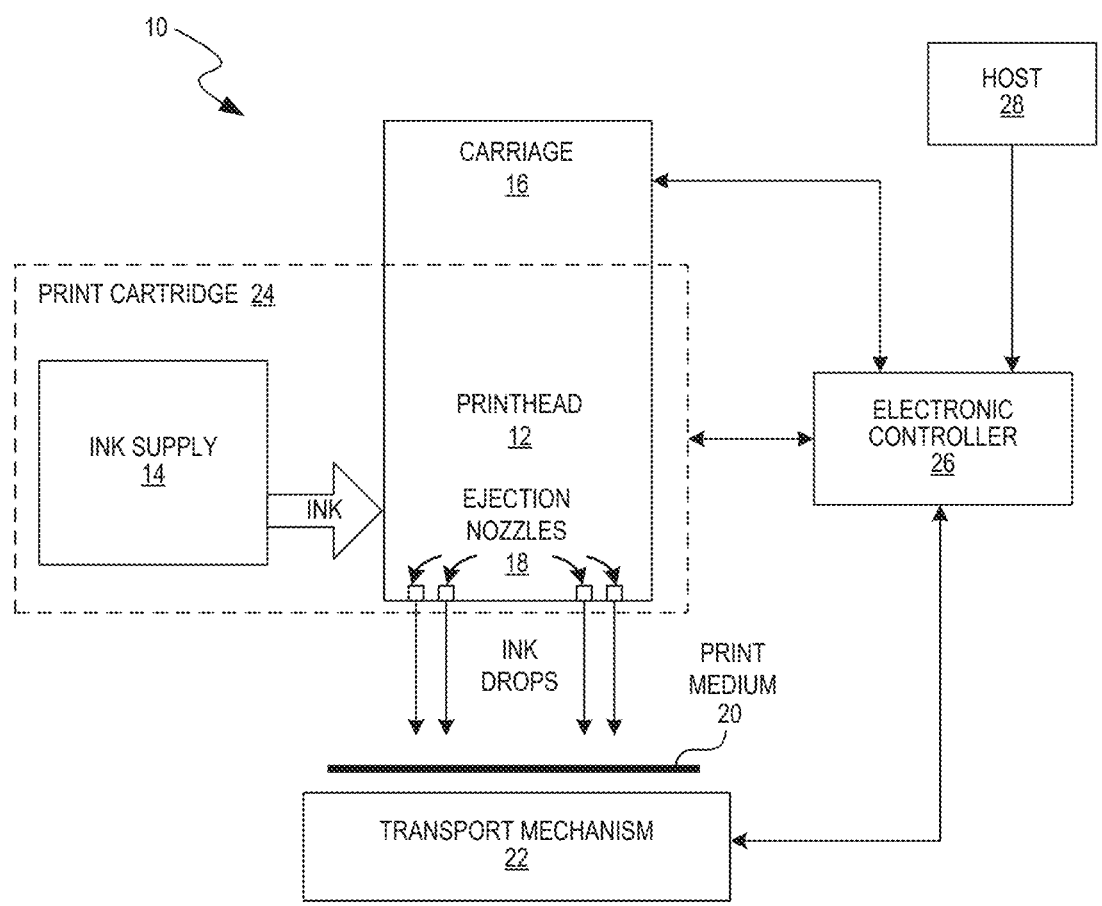
FIG. 2 is a block diagram that illustrates components of an inkjet printer including nozzles that eject ink to print an image on media according to some embodiments of the present disclosure.

FIG. 2 is a block diagram that illustrates components of an inkjet printer including nozzles that can eject ink to print an image on media according to some embodiments of the present disclosure. The inkjet printer 10 includes a printhead 12, an ink supply 14, and a carriage 16. The printhead 12 includes ejection nozzles 18 for ejecting drops of ink onto printing medium 20 transported by a transport mechanism 22. The ink supply 14 and printhead 12 can be housed in a print cartridge 24 of the printer 10.

The printer 10 also includes an electronic controller 26 for controlling the operations of the carriage 16, the print cartridge 24, and the transport mechanism 22. The carriage 16 can include a drive mechanism to carry the printhead 12 back and forth across the medium 20 under control of the controller 26. Hence, the carriage 16 is movable to position the printhead 12 relative to the medium 20.

The printhead 12 may have a nozzle plate including an array of the nozzles 18. A circuit can carry electrical traces from the controller 26 to actuators (e.g., firing resistors or a piezoelectric crystal) behind the ejection nozzles 18. In operation, the controller 26 selectively energizes an actuator of a nozzle to eject a drop of ink through the nozzle. This process repeats to eject ink by any of the nozzles 18 onto the medium 20.

The transport mechanism 22 can advance the medium 20 past the printhead 12 under control of the controller 26. As such, the printer 10 can print a section of an image onto the medium 20. The section can correspond to at least a step size taken by the printer 10 to advance the medium 20 in a downstream direction.

As such, the controller 26 can receive print data from a computer or other host device 28 and process the print data into printer control information and image data. The controller 26 then coordinates the relative position of printhead 12 and medium 20 with the ejection of ink drops to produce the desired image on the medium 20 according to the print data received from host device 28.

Print quality can deteriorate as debris eventually clogs nozzles. However, other nozzles can be used to compensate for a defective printer nozzle. For example, consider an array of nozzles of a printhead that is 20 inches long and prints in a four-pass mode. The medium upon which an image is printed moves five inches after the printhead passes across the medium. On a first pass, the printer can print a five-inch section of an image on the medium. On the second pass, the medium has moved another five inches, and the printer prints a ten-inch section on the medium. On the third pass, the medium has moved another five inches, and the printer prints a fifteen-inch section on the medium. On the fourth pass, the printer is printing a section corresponding to the entire array of nozzles on the medium. As such, every printed section on the medium has the carriage pass over it four times to collectively print an image on the medium. Thus, there could be up to four opportunities to correct any single pixel that was not addressed due to a defective printer nozzle.

Thus, other nozzles can be used to eject ink in the same or neighboring pixel locations where a defective printer nozzle should have printed. Hence, other nozzles can effectively complement the function of defective printer nozzles in subsequent passes of the printheads over a medium. This nozzle replacement strategy relies on identifying a defective printer nozzle, identifying complementary nozzles that are capable of printing in the same or neighboring pixel locations as the defective printer nozzle, albeit on a different pass, and rerouting the image data of the defective printer nozzle to a complementary nozzle.

In industrial printing environments, printers operate as fast as possible. As a result, some print modes may not allow for some other nozzles to fully compensate for a defective printer nozzle. However, the disclosed embodiments can perform at least some compensation even though it is not always possible to identify other nozzles that can fully compensate for a defective printer nozzle. For example, a multi-tiered compensation process can include a first and most effective tier that uses fully complementary nozzles as a straightforward nozzle compensation approach, when possible. For defective printer nozzles lacking a nozzle that can fully compensate for the failed nozzle, a second tier of compensation can be employed whereby nozzles partially compensate to print using the image data associated with the defective printer nozzles. As described further below, other or additional tiers of compensation can be employed so that any failed pixel due to a defective printer nozzle can receive some level of compensation regardless of print mode.

The disclosed embodiments can include a nozzle manager of the controller 26 coupled to memory of the printhead 12 that contains data pertaining to the status and location of each of the nozzles 18. The data can include a nozzle map used to route image data for use by the nozzles 18 to print at pixel locations of an image. The data may include status information indicative of whether or not a nozzle is malfunctioning, and the location of the defective printer nozzle. Accordingly, should the array have a defective printer nozzle, such information can be stored as data in memory. Therefore, the data from the memory can be read and communicated to bypass the defective printer nozzle, and compensate for the defective printer nozzle with a functioning nozzle during a subsequent pass by the printhead 12 over the medium 20.

The disclosed techniques where image data for defective printer nozzles is rerouted to other nozzles to avoid printing defects can be referred to as compensation techniques. Hence, defective printer nozzles that could be scheduled to print in pixel locations using image data can forego doing so in accordance with a compensation process, and the data can be rerouted for other nozzles to compensate for the defective printer nozzles. In addition, the disclosed embodiments can include combinations of compensation tiers using partially and/or fully complementary nozzles to provide varying degrees of compensation.

The disclosed embodiments can use compensation techniques in various print modes to compensate for defective printer nozzles. FIGS. 3A through 5B illustrate examples of nozzle maps and related image build grids ("image builds") that can be used to implement partially and/or fully complementary nozzles using varying degrees of smoothing. The disclosed embodiments are not limited by the specific dimensions of the nozzle maps or image builds shown in these figures. Instead, the figures illustrate simple examples meant to aid in understanding aspects of the disclosed embodiments.

FIGS. 3A and 3B respectively illustrate a nozzle map and related image build that can only use partially complementary nozzles to compensate for defective printer nozzles. Specifically, FIG. 3A illustrates a nozzle map that does not employ smoothing to build an image but can compensate for defective printer nozzles with partially complementary nozzles according to some embodiments of the present disclosure. Thus, each nozzle that can address a given pixel location in accordance with its image data will eject ink rather than reroute the image data for later use or use by other nozzles. FIG. 3B illustrates an image build indicative of print passes and pixel locations where nozzles can print dots to form an image according to some embodiments of the present disclosure. The printer can use the nozzle map to identify and reroute image data of a defective printer nozzle to other nozzles that compensate for the defective printer nozzle without smoothing.

The nozzle map of FIG. 3A includes raster rows $R_1$ through $R_{32}$ and pass columns $P_1$ through $P_8$. The raster rows represent raster lines of an image, and the pass columns represent the sequence of multiple passes of a printhead over media used by shuttle based printers to build an image. An intersection of a raster row and a pass column can be indicative of a pixel location of the image that can include a dot of ink printed by ejecting ink from a nozzle.

In this example, the printhead includes an array of nozzles $N_1$ through $N_6$ that are used to print a spatial distribution of dots in pixel locations that form an image. As such, the nozzle map defines the nozzle responsible for printing a dot in a specified pixel location during a specified pass of the printhead over the media. Moreover, the pass columns are designated as either odd (O) or even (E) passes. This designation indicates whether printing by specific nozzles mapped to pixel locations for a specific pass column occurs on alternating odd or even passes of the printhead over the media.

Thus, the nozzle map of FIG. 3A is used for mapping six nozzles $N_1$ through $N_6$ to print dots in pixel locations in accordance with image data during at least one of eight passes $P_1$ through $P_8$. For each pixel location with an associated nozzle value, that specific nozzle is responsible for ejecting ink in the pixel location during the specified pass. As shown, the nozzle map includes some pixel locations without nozzle values. Hence, the nozzles can be arranged such that dots are not printed on consecutive raster rows in each pass. In other words, nozzles can be spatially separated by a number of raster rows such that printing by the nozzles during each pass skips that number of raster rows. Moreover, the spacing between nozzles of each print pass or across passes can have any pattern including regular, irregular, dynamic, and/or static patterns.

The arrangement of nozzles for each pass column of the nozzle map is offset by a number of raster rows relative to a previous pass column. The offset represents a step size taken by the printhead before printing a next pass column. Although FIG. 3A indicates that a printhead steps a number of raster rows, a person skilled in the art would understand that the offset can be achieved by stepping the media the same number of raster rows rather than stepping the printhead. The step size for each pass or across passes can have any pattern including regular, irregular, dynamic, and/or static patterns.

A printer can interleave printing by an array of nozzles to achieve printed images having varying degrees of resolutions. The nozzle map of FIG. 3A shows use of a low density nozzle array to print a higher density of dots. That is, the density of nozzles in the array is lower than the density of dots that can be printed by the nozzles to achieve an image resolution. For example, suppose a printhead has an array of 180 nozzles evenly separated by $\frac{1}{180}$ of an inch. To print 360 dots per inch (dpi), the step size used for printing is such that the 180 nozzles print on a second pass at locations between where the nozzles printed on a first pass. As such, 180 nozzles can print 360 raster lines or rows with two passes by the printhead such that the dots are separated by $\frac{1}{360}$ of an inch. Accordingly, the resolution of images can be twice or any multiple of the resolution of the nozzles by interleaving the printing of the nozzles.

Specifically, the nozzle map of FIG. 3A shows an example print head containing six nozzles such that that the array of nozzles $N_1$ through $N_6$ print on every other raster row for each pass. Further, each pass is offset by three raster rows, which represents the step size of the printhead. For example, the nozzles [$N_1$, $N_2$, $N_3$, $N_4$, $N_5$, $N_6$] print on raster rows [1, 3, 5, 7, 9, 11] on the first (odd) pass $P_1$. Then, after stepping three raster rows, the same nozzles print on raster rows [4, 6, 8, 10, 12, 14] on the second (odd) pass P2. As a result, the nozzles N1 through N6 can interleave dots on the second pass $P_2$ in locations between the locations where those nozzles could have printed on the first pass $P_1$. After stepping another three raster rows, the same nozzles print on raster rows [7, 9, 11, 13, 15, 17] on the third (even) pass P3. Then, after stepping yet another three raster rows, the same nozzles print on raster rows [10, 12, 14, 16, 18, 20] on the fourth (even) pass P4, and so on for the remaining passes P5 through P8. This results in a high resolution image that takes only four passes to fully print a given section. That is, the fourth pass is a final pass because four passes are required for a nozzle to print all possible image locations on that section of the print media (e.g., between each of the nozzles $N_1$ through $N_6$).

As indicated above, shuttle based printers are usually operated in high speed printing modes. For example, a shuttle based printer can operate a carriage to move a printhead over a medium at twice the firing rate of the nozzles. As a result, a nozzle may not print on every raster column of an image formed of raster rows and raster columns. Instead, a nozzle may print to every other raster column of a raster row for each pass. Accordingly, the shuttle based printer not only interleaves the nozzles across raster rows, but can also interleave the nozzles across raster columns to build an image.

FIG. 3B illustrates an image build formed by implementing the nozzle map of FIG. 3A. The image build represents pixel locations at the intersection of the raster rows $R_1$ through $R_{32}$ and raster columns $C_1$ through $C_9$. Each box that represents a pixel location can include a pass-nozzle pair of values denoted as $[P_x, N_y]$. The pass-nozzle pair values for the image build are determined based on the nozzle map of FIG. 3A. For example, the nozzle map indicates that nozzle $N_3$ is responsible to print raster row $R_8$ during the second pass $P_2$, which is an odd pass. As such, the pass-nozzle pair $[P_2, N_3]$ is associated with every odd raster column $[C_1, C_3, C_5, C_7, C_9]$ of the raster row $R_8$ to indicate that the nozzle $N_3$ is responsible for printing at each of the corresponding pixel locations.

Accordingly, a central region of the image build of FIG. 3A is formed by interleaving the print operations of the nozzles N1 through N6 according to the nozzle map of FIG. 3A. In the illustrated example, a fourth of the pixels are printed in the region during a first pass, and another fourth of the pixels are printed in the region during a second pass. Thus, half of the pixels can be filled after two passes. The remaining two passes can fill in the remaining pixels of the image build. Thus, every one of the pixels in the central region can be addressed by a nozzle during a pass of the printhead.

As commonly occurs with inkjet printers, any of the nozzles $N_1$ through $N_6$ may fail to operate properly. For example, nozzle $N_3$ could become plugged with hardened ink that prevents the nozzle from ejecting ink at the pixel locations indicated in the image build of FIG. 3B. As a result, a printed image can have pixels that failed to receive ink, which impairs the print quality of the printed image.

FIGS. 3A and 3B illustrate at least one technique to overcome these drawbacks. A fully complementary nozzle can print in the same raster row and in the same odd or even position as the defective printer nozzle. That is, a fully complementary nozzle can print in exactly the same pixel location as the location of the defective printer nozzle. In contrast, partially complementary nozzles can print on the same raster rows but in opposite odd or even positions. That is, partially complementary nozzles can print in pixel locations neighboring the pixel locations where the defective printer nozzle could have printed. Thus, partially complementary nozzles can print in a pixel location slightly offset from the actual pixel location of the defective printer nozzle.

In the embodiments illustrated by FIGS. 3A and 3B, only one nozzle is responsible for printing any of the pixel locations. Consequently, nozzles $N_1$ through $N_6$ do not have any fully complementary nozzles that can compensate for defective printer nozzles. For example, if nozzle $N_5$ is malfunctioning, it may not eject any ink onto media. There is no other nozzle that could address the exact pixel location of the nozzle $N_5$, and as such, those pixel locations would be left blank. Thus, fully complementary nozzles cannot be used to address printing defects in this case.

However, defective printer nozzles can be addressed with partially complimentary nozzles that can print in neighboring pixel locations of the same raster row. For example, the pass-nozzle pair $[P_1, N_5]$ can print in the pixels located in the odd raster columns $[C_1, C_3, C_5, C_7, C_9]$ of the raster row $R_9$. The pass-nozzle pair $[P_3, N_2]$ can print in the neighboring pixel locations in the even raster columns $[C_2, C_4, C_6, C_8]$ of the raster row R9. As such, the nozzle $N_2$ is a partially complementary nozzle to nozzle $N_5$. TABLE 1 shows a mapping between nozzles and their partially complementary nozzles which can be implemented without smoothing to compensate for defective printer nozzles.

TABLE 1

| Nozzle Map for Non-Smoothing Print Mode | | |
|---|---|---|
| Nozzle (e.g., defective) | Fully Complementary Nozzles | Partially Complementary Nozzles |
| 1 | — | 4 |
| 2 | — | 5 |
| 3 | — | 6 |
| 4 | — | 1 |
| 5 | — | 2 |
| 6 | — | 3 |

To compensate for defective printer nozzles, the printer can reroute image data meant for use by the defective printer nozzles to use by partially complementary nozzles. Hence, the rerouted image data may cause the partially complementary nozzles to eject ink in pixel locations neighboring the pixel locations where the defective printer nozzles would have ejected ink.

Figure 4A:
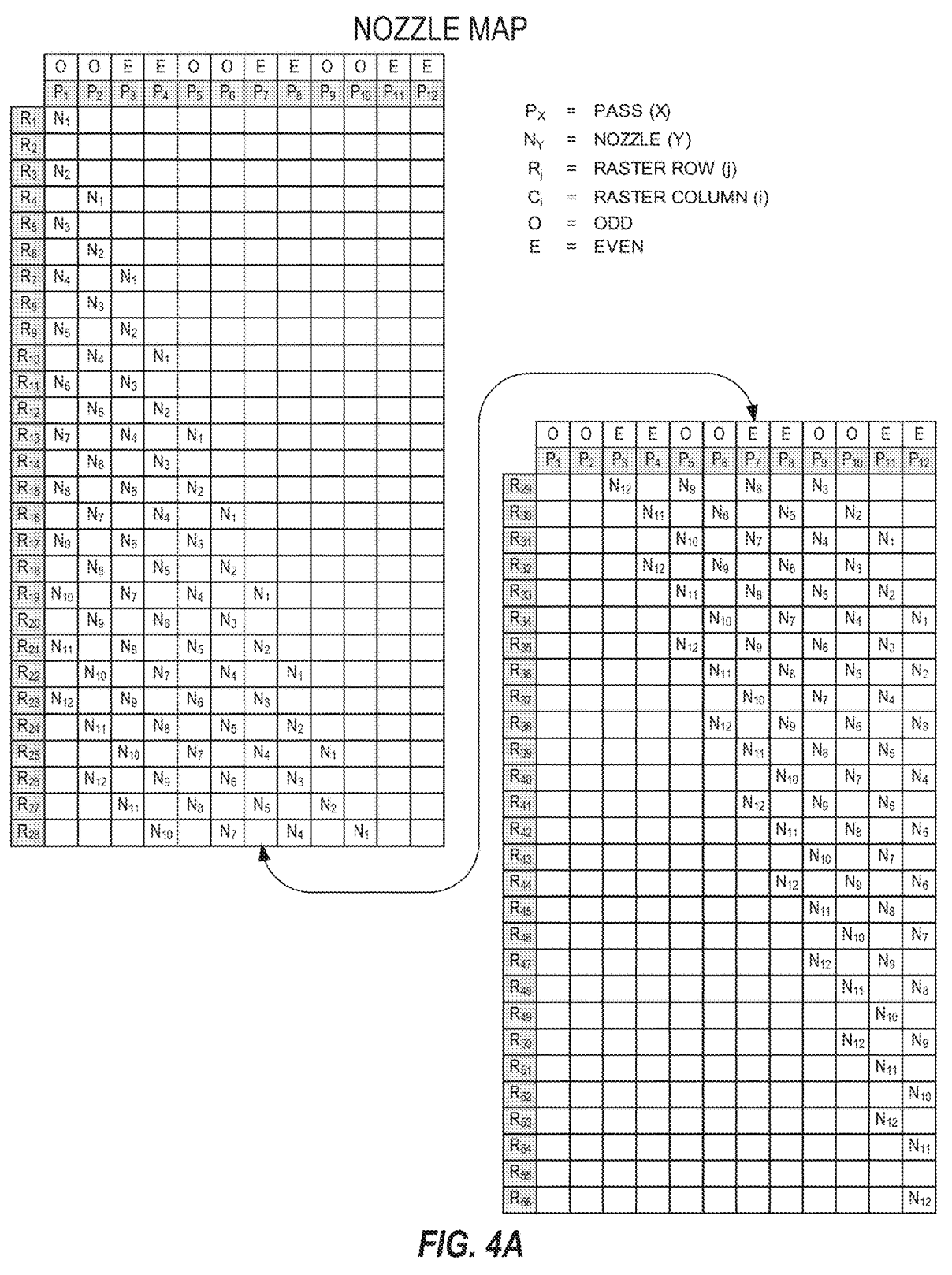
Figure 4B:
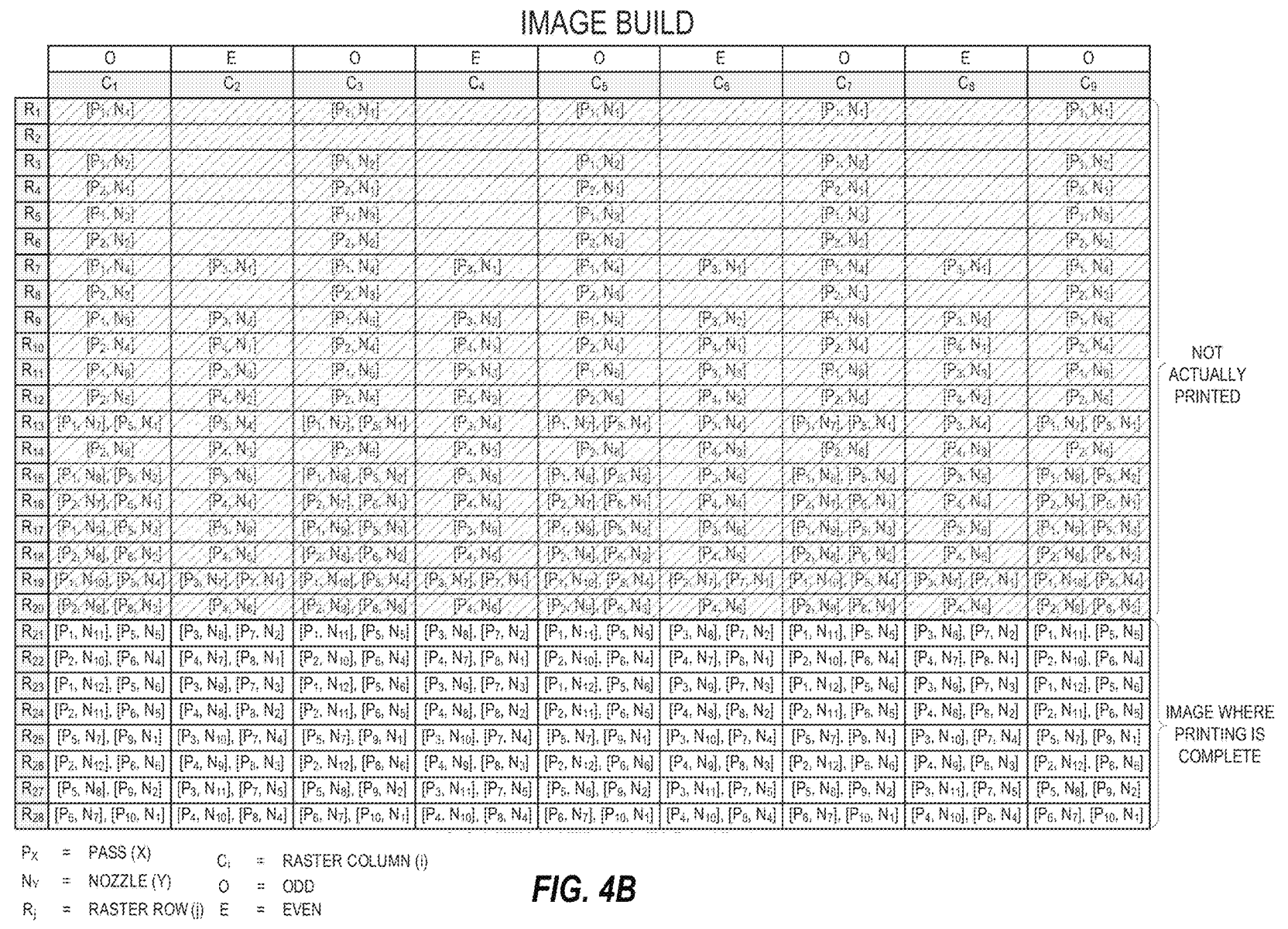
Figure 4B:
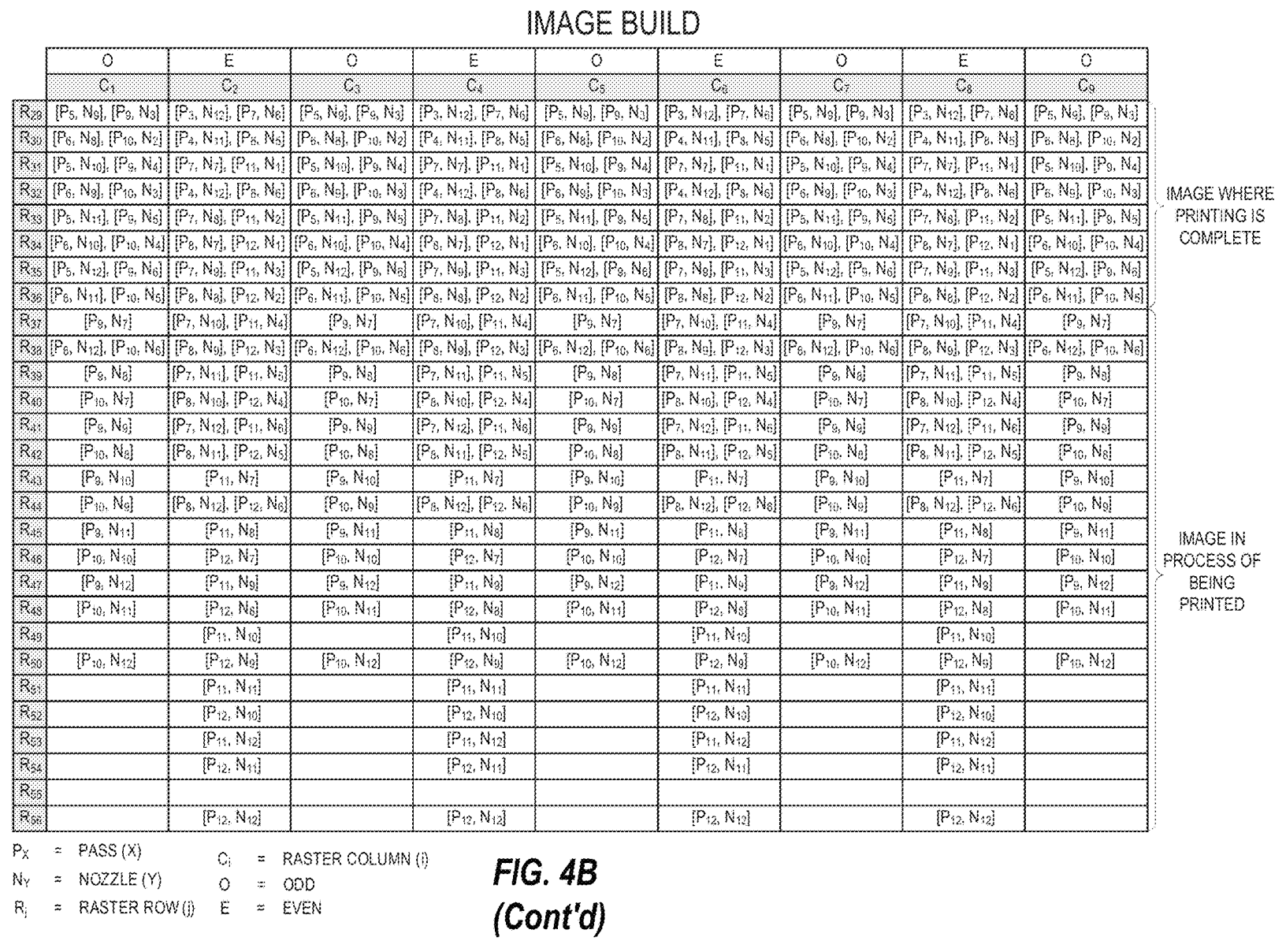

FIGS. 4A and 4B respectively illustrate a nozzle map and related image build for printing in a heavy smoothing print mode. In this example, the print head is taken to have 12 nozzles. The heavy smoothing mode can use fully complementary nozzles and/or partially complementary nozzles to compensate for each and every defective printer nozzle. Specifically, FIG. 4A illustrates a nozzle map for a heavy smoothing print mode implemented by a printer to build an image. Thus, each pixel location can be addressed by a fully complementary nozzle and two partially complementary nozzles.

FIG. 4B illustrates an image build indicative of print passes and pixel locations where nozzles can print dots to form an image according to some embodiments of the present disclosure. In the event of a defective printer nozzle, the printer can use the nozzle map to identify fully and/or partially complementary nozzles and compensate for the defective printer nozzles by rerouting image data for the complementary nozzles. The heavy smoothing print mode uses additional passes compared to the light smoothing print mode, which enables compensating for any defective printer nozzles with fully or partially complementary nozzles. In particular, the nozzle map of FIG. 5A shows this print mode using twice the number of passes compared to the no-smoothing example. FIG. 5A shows the nozzle array is passed eight times over every section of media. The example shows twelve passes in total. Those skilled in the art will recognize that a larger image will require additional passes to complete printing of the image than the example shown here, but in all cases the print head will pass over each part of the media eight times.

TABLE 2 shows a mapping between nozzles and their fully and partially complementary nozzles, which can be implemented to compensate for defective printer nozzles in a heavy smoothing print mode. As shown, each nozzle has a fully complementary nozzle and two partially complementary nozzles.

TABLE 2

Nozzle Map with Heavy Smoothing

| Nozzle (e.g., defective) | Fully Complementary Nozzles | Partially Complementary Nozzles |
| --- | --- | --- |
| 1 | 7 | 10, 4 |
| 2 | 8 | 11, 5 |
| 3 | 9 | 12, 6 |
| 4 | 10 | 7, 1 |
| 5 | 11 | 8, 2 |
| 6 | 12 | 9, 3 |
| 7 | 1 | 10, 4 |
| 8 | 2 | 11, 5 |
| 9 | 3 | 12, 6 |
| 10 | 4 | 7, 1 |
| 11 | 5 | 8, 2 |
| 12 | 6 | 9, 3 |

To compensate for defective printer nozzles in a heavy smoothing print mode, the printer can reroute image data meant for the defective printer nozzles to their fully complementary nozzles and/or any partially complementary nozzles. For example, the rerouted image data may cause a fully complementary nozzle to eject an amount of ink of a particular color in the exact same location where a defective printer nozzle would have ejected ink. Alternatively, or additionally, the rerouted image data may cause partially complementary nozzles to eject an amount of ink of a particular color in pixel locations neighboring the pixel locations where the defective printer nozzles would have ejected ink.

As Table 2 indicates, this heavy smoothing print mode shows every nozzle has a fully complementary nozzle. During normal printing operation, therefore, the printer has a choice as to which nozzle to use to print any given pixel location: it can either use the first nozzle to address that pixel location or its fully complementary nozzle. In fact, it should be evident to those skilled in the art that it is possible to create print modes with higher levels of redundancy, for example, where every nozzle has two or more fully complementary nozzles. Therefore, a mechanism is required to instruct the printer on which of the fully complementary nozzles to use. This is typically accomplished by way of a print mask. In one particular form, the print mask could be a binary two-dimensional array with a height equal to the number of nozzles in the print head array and the width equal to the width of the image being printed (or a narrower array that is tiled horizontally until it matches the image width). The binary print mask has a TRUE value where it is desired to have that nozzle print image data; likewise, it has a FALSE value where that nozzle is instructed not to print. Therefore, a set of fully complementary nozzles will have at least one TRUE value at each column of the print mask. During the printing operation, on each pass, the print mask is mathematically ANDED with the image data. This ensures that each image pixel location will be printed once and only once by one of the fully complementary nozzles. If a print mode is designed to "double strike" every pixel (i.e., be capable of depositing two drops of ink at each pixel location), the mask would have two TRUE values for a set of fully complementary nozzles for every column of the print mask.

FIGS. 5 through 9 are flow diagrams illustrating methods for modifying a print mask or image data used for a print job to compensate for defective printer nozzles. The methods include techniques for modifying a print mask by rerouting image data of a defective printer nozzle to other nozzles and/or modifying image data printed by the other nozzles. As such, some compensation techniques involve substituting the printing of defective printer nozzles with other nozzles using varying degrees of smoothing, and other compensation techniques involve modifying image data printed by other nozzles to compensate for the defective printer nozzles. In some embodiments, the print masks and image data values may be kept in memory and modified in memory before printing.

Figure 5:
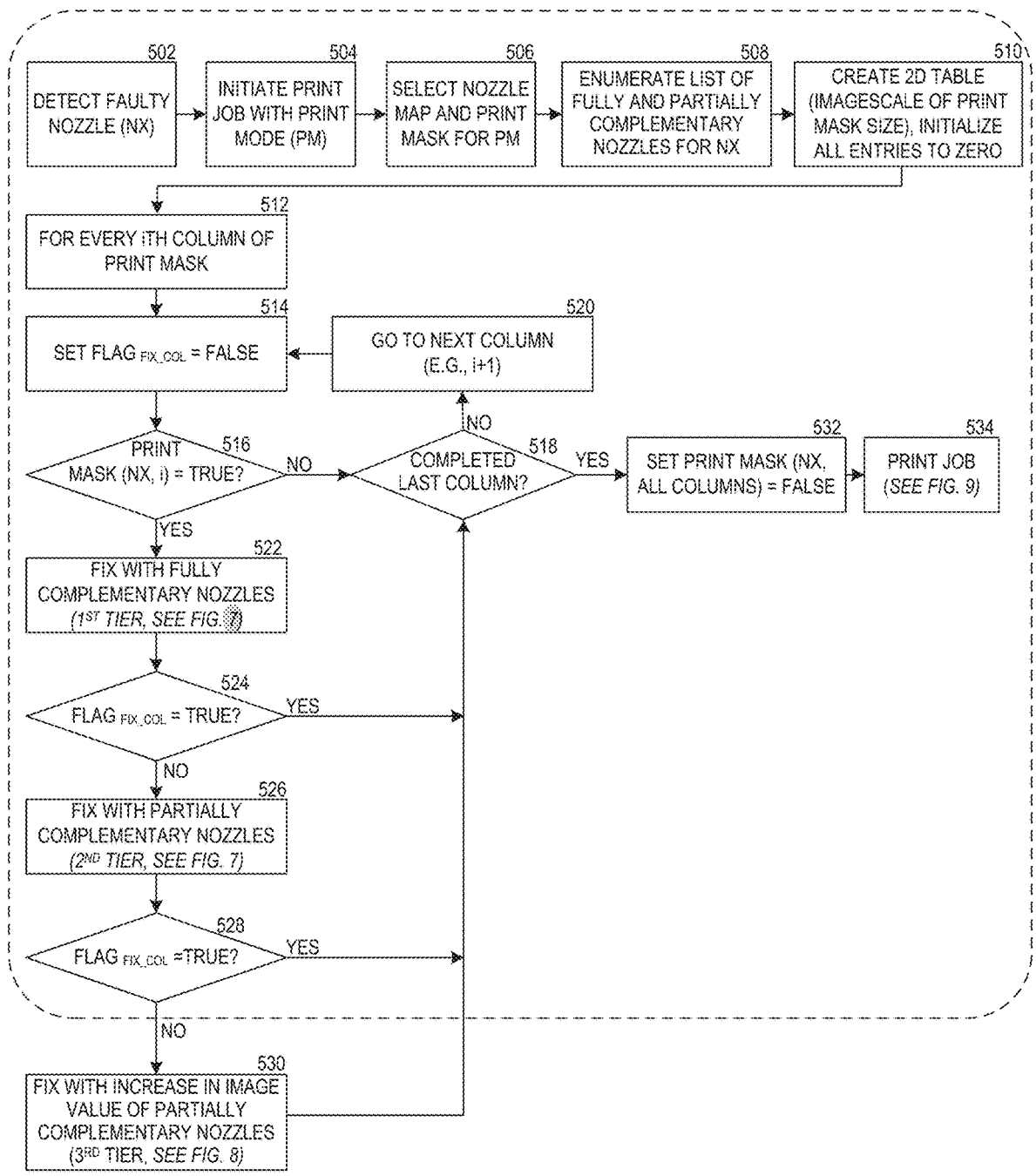
FIG. 5 is a flow diagram illustrating a compensation scheme that implements multiple tiers to compensate for defective printer nozzles according to some embodiments of the present disclosure.

FIG. 5 is a flow diagram illustrating a compensation scheme that implements multiple tiers to compensate for defective printer nozzles according to some embodiments of the present disclosure. The illustrated method shows a compensation scheme that includes four ordered tiers. However, a compensation scheme may involve any number of tiers arranged in any order to obtain a desired compensation effect. As such, FIG. 5 merely illustrates an example of a compensation scheme that could be modified in any number of ways to achieve a desired compensation effect.

The method of FIG. 5 involves modifying a print mask and/or modifying image data values used for printing an image of a print job. The print mask maps nozzles to particular image pixels of an image to be printed. For example, when two complementary nozzles can print at the same image pixel, the print mask would schedule one of the two nozzles to print the required image pixel. The print mask can be modified in accordance with any combination of tiers to compensate for defective printer nozzles. For example, the print mask may be modified to use fully and/or partially complementary nozzles to compensate for failed nozzles. Moreover, a combination of tiers could be selected to provide any desired amount of compensation. For example, a compensation scheme may involve a first compensation tier that modifies a print mask to use fully complimentary nozzles, a second compensation tier that modifies a print mask to use partially complementary nozzles, a third compensation tier that modifies image data values of nozzles neighboring the defective printer nozzles, and so on.

In some embodiments, a first tier that involves using fully complementary nozzles alone may be sufficient to compensate for defective printer nozzles. In some embodiments, the first tier can be combined with a second tier to incorporate using partially complementary nozzles to compensate for some defective printer nozzles that do not have fully complementary nozzles. In some embodiments, the combination of these two tiers could be sufficient to compensate for the vast majority of defective printer nozzles. As such, the dashed line shown in FIG. 5 represents a portion of the compensation scheme that includes only the first and second tiers, which could be sufficient to compensate for the majority of defective printer nozzles without any additional compensation techniques.

In step 502, at least one failed nozzle ($N_x$) of a printhead is detected. For example, a printer may include an image inspection system that uses a camera to capture samples of images being printed on media. The captured samples may be checked for imperfections indicative of a defective printer nozzle. In another example, a user may print a diagnostic grid of pixels to check for failed nozzles or run an electrical diagnostic routine to check for the failed nozzles. As such, the printer can detect a failed nozzle and initiate one or more compensation tiers to compensate for the defective printer nozzle.

The printer can compensate for the defective printer nozzle when printing an image of a print job by modifying a print mask used to print the image. For example, in step 504, a print mode (PM) is selected to complete a print job. In some embodiments, the print mode is selected by a user or automatically selected by the printer. In step 506, the nozzle map and print mask is created or retrieved from memory for printing the image in accordance with the selected print mode. In some embodiments, the nozzle map may be specific for a given print mode to enable heavy or light smoothing compensation, or compensation without smoothing.

In step 508, an enumerated list of fully complementary nozzles (FCNs) and partially complementary nozzles (PCNs) that may be used to compensate for the failed nozzle is obtained. For example, the enumerated list of fully and/or partially complementary nozzles can be derived from the nozzle map as described above. In some embodiments, the enumerated list may be pre-computed and retrieved from memory. In some embodiments, the enumerated list may be generated after failed nozzles have been detected. TABLES 1 and 2 shown above are examples of enumerated lists. In step 510, a two-dimensional (2D) table ("ImageScale") is created that can modify the image data printed with the print mask. In some embodiments, the ImageScale is the same size (i.e., dimensions) as the print mask. The entries of the ImageScale are all initialized to zero.

The remaining steps of the method include several loops used to iteratively check for raster columns of the print mask mapped to defective printer nozzles and modify the print mask or image data values to compensate for the defective printer nozzles. In step 512, the ith column of the print mask is checked for pixels mapped to defective printer nozzles. In step 514, a fixed column flag ("flag$_{Fix\_Col}$") is set to false for the ith column, which indicates that the ith column has not undergone compensation. In step 516, the row of the print mask attributed to nozzle $N_x$ is checked to determine whether the ith column is mapped to a defective printer nozzle. If not, the loop continues to step 518 to check whether the ith column is the last column of the print mask. If not, the loop continues to step 520 to check the next column (ith+1 column). In some embodiments, the loop formed by the steps 514 through 520 iterates until each column of the print mask has been evaluated to compensate for any defective printer nozzles.

In step 516, if the ith column of the $N_x$ row of the print mask being evaluated is TRUE, then the method continues through one or more tiers to compensate for that defective printer nozzle. In step 522, a first tier involves using fully complimentary nozzles to compensate for defective printer nozzles when possible (e.g., when fully complimentary nozzles are available). If fully complimentary nozzles are not available to compensate for the defective printer nozzles, the fixed column flag for the ith column (including the defective printer nozzle) remains set to false in step 524 and the method continues through another tier of compensation.

In step 526, a second tier involves using partially complementary nozzles to compensate for the defective printer nozzles when possible (e.g., when partially complimentary nozzles are available). If partially complementary nozzles are not available, the fixed column flag for the ith column including the failed nozzle remains set to false in step 528, and the method continues through another tier of compensation.

In step 530, a third tier involves increasing the image data values printed by partially complementary nozzles to compensate for the defective nozzles. If compensation remains unavailable or ineffective, then the method of FIG. 5 has failed to compensate for the defective printer nozzle of the ith column, and the method evaluates the remaining columns iteratively to compensate when possible.

As described further below, the fixed column flag for the ith column can change to true when the print mask and/or image data has been modified to successfully compensate for any failed nozzles of the ith column by using the particular compensation tier. Thus, if the fixed column flag is true or all the compensation tiers have been processed for the ith column, the method continues to step 518 to evaluate any remaining columns that may require compensation before printing the print job with the modified print mask. After all the columns of the print mask have been checked and all defective printer nozzles have been compensated for (when possible), a print mask value indicative of the existence of defective printer nozzles is set to false in step 532, and the print job is executed in step 534.

Figure 6:
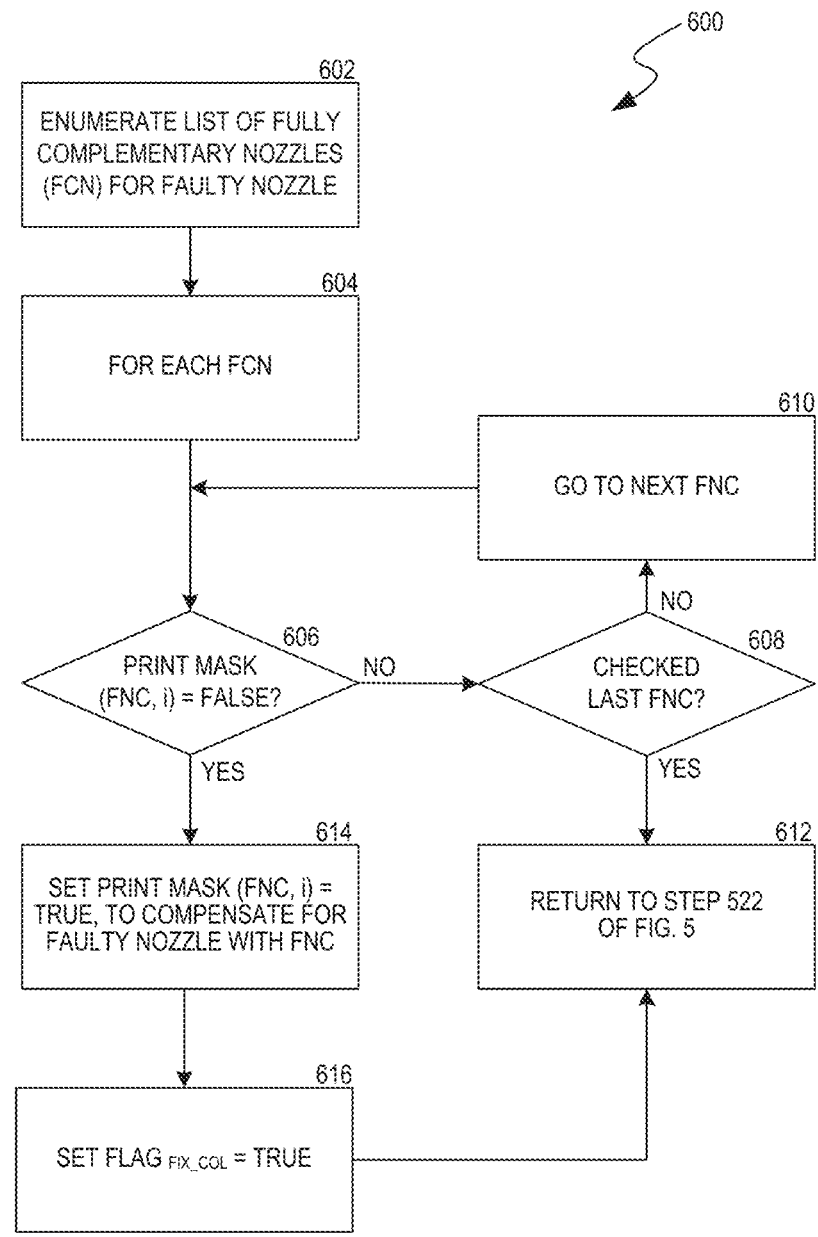
FIG. 6 is a flow diagram illustrating a method using fully complementary nozzles to compensate for defective printer nozzles according to some embodiments of the present disclosure.

FIG. 6 is a flow diagram illustrating a method using fully complementary nozzles to compensate for defective printer nozzles according to some embodiments of the present disclosure. For example, the first tier compensation of step 622 may involve evaluating fully complementary nozzles of each defective printer nozzle, and modifying the print mask to use a suitable fully complementary nozzle to print in locations of ith columns where the defective printer nozzles were scheduled to print. In step 602, a list of fully complementary nozzles is enumerated for a defective printer nozzle of the ith column currently being evaluated. In some embodiments, the enumerated list can be obtained as a subset of the enumerated list of fully and partially complementary nozzles obtained in step 608.

In step 604, each fully complementary nozzle of the enumerated list is evaluated to determine whether it could compensate for the defective printer nozzle printing mapped to the ith column. In step 606, the print mask is checked to determine whether the fully complementary nozzle is not already scheduled to print in the ith column where the defective printer nozzle is scheduled to print. If already scheduled to print in the ith column, the fully complementary nozzle cannot be used for compensating. In step 608, the enumerated list is checked to determine whether there are any remaining fully complementary nozzles. In steps 608 and 610, if there are remaining nozzles on the list, then the remaining nozzles are iteratively evaluated to determine whether they are not already schedule to print on the ith column. In step 612, if there are no remaining nozzles on the list, then a suitable fully complementary nozzle was not identified and the method 600 returns to step 622 to evaluate a compensation tier.

Referring back to step 606, if the fully complementary nozzle being evaluated is not scheduled to print on the ith column, then, in step 614, the print mask is modified to compensate for the defective printer nozzle by rerouting image data to that fully complementary nozzle. In step 616, upon scheduling the fully complementary nozzle to compensate for the defective printer nozzle, the fixed column flag is set to true to indicate that the print mask was successfully modified to compensate for printing in the ith column. Hence, no further tiers of compensation are necessary for the ith column because a fully complementary nozzle is being used to compensate for the defective printer nozzle. Lastly, in step 612, the method 600 returns to step 622 and may continue to evaluate any remaining columns.

Figure 7:
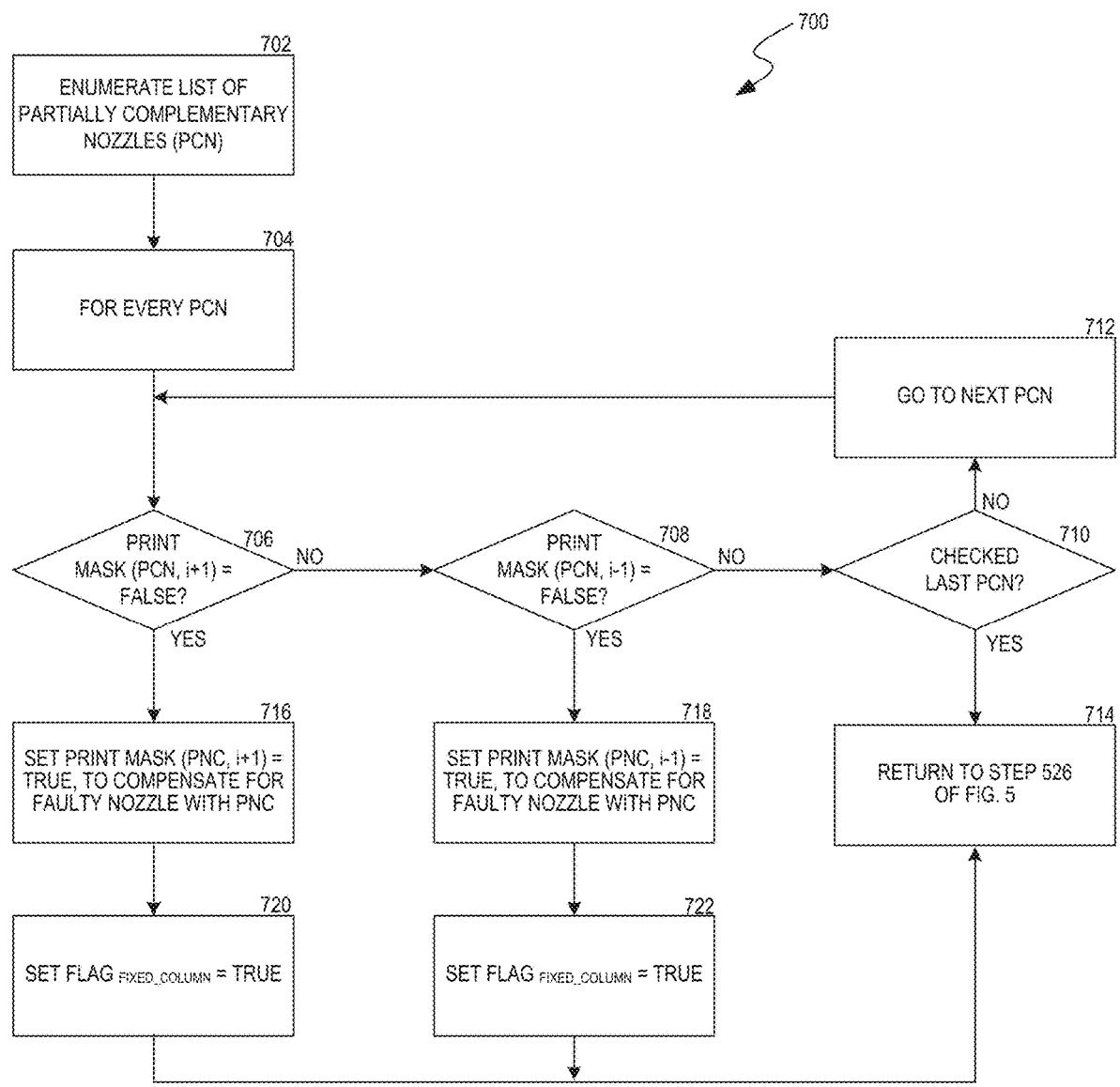
FIG. 7 is a flow diagram illustrating a method using partially complementary nozzles to compensate for defective printer nozzles according to some embodiments of the present disclosure.

FIG. 7 is a flow diagram illustrating a method using partially complementary nozzles to compensate for defective printer nozzles according to some embodiments of the present disclosure. For example, a second tier compensation of step 526 may involve evaluating partially complementary nozzles for each defective printer nozzle and modifying the print mask to use a suitable partially complementary nozzle to print the ith column, where a defective printer nozzle may have been scheduled to print.

In step 702, an enumerated list of partially complementary nozzles is obtained for the defective printer nozzle of the ith column identified in step 716. For example, the enumerated list of partially complementary nozzles for the ith column may be obtained as a subset of the enumerated list of fully and partially complementary nozzles obtained in step 508. In step 704, each partially complementary nozzle of the enumerated list is evaluated to determine whether it could compensate for the defective printer nozzle scheduled to print in the ith column. Specifically, in step 706, the print mask is checked to determine whether a nozzle on the enumerated list is not already scheduled to print in a column neighboring the column where the defective printer nozzle would have printed. More specifically, the print mask is checked to determine whether the partially complementary nozzle is not already scheduled to print in the ith+1 column.

In step 708, if the partially complementary nozzle is already scheduled to print in the ith+1 column, then the print mask is checked to determine whether the enumerated partially complementary nozzle is scheduled to print in another column neighboring where the defective printer nozzle would have printed. More specifically, the print mask is checked to determine whether the partially complementary nozzle is not already scheduled to print the ith−1 column. Hence, if the partially complementary nozzle is already scheduled to print in the ith+1 or ith−1 column, then that nozzle cannot be used for compensating.

In step 710, the enumerated list of partially complementary nozzles is checked to determine whether there are any remaining nozzles on the list that have not been evaluated as suitable partially complementary nozzles. In step 712, if there are any remaining nozzles on the list, the next nozzle on the list is evaluated to determine whether it would be a suitable partially complementary nozzle. On the other hand, if the currently evaluated nozzle is the last nozzle on the list of partially complementary nozzles, then all the partially complementary nozzles on the enumerated list have been checked and a suitable partially complementary nozzle was not identified. If so, in step 714, the method 700 returns to step 526 and continues by evaluating remaining tier to compensate for the defective printer nozzle scheduled to print in the ith column.

Referring back to each of steps 706 or 708, if the evaluated nozzle is not scheduled to print in the ith+1 or ith−1 columns, then, in steps 716 or 718, the print mask is modified to schedule the evaluated nozzle to compensate for the defective printer nozzle by printing in its respective neighboring column. As such, the print mask is modified to compensate for the defective printer nozzle scheduled to print in the ith column by using the partially complementary nozzle.

In steps 720 or 722, the fixed column flag is set to true, which indicates that no further tiers of compensation are necessary to compensate for the ith column because a partially complementary nozzle has successfully been scheduled to compensate for the corresponding defective printer nozzle. Lastly, in step 714, the method returns to step 626 and may continue to evaluate any remaining columns.

As indicated above, other compensation tiers may involve modifying the image data values printed by nozzles rather than rerouting image data of defective printer nozzles to other nozzles. In other words, compensation can involve modifying an image rather than modifying the print mask to compensate for the defective printer nozzles. For example, image data can be modified to cause nozzles to print larger dots in pixel locations neighboring pixel locations where defective printer nozzles were scheduled to print.

Note that the compensation technique of FIG. 7 does not modify the image data. Rather, that compensation technique will cause a change (e.g., increase) in an amount of ink deposited in a neighboring column (e.g., by double striking that pixel location) if and only if ink was already requested at that neighboring raster column in the original image data. This contrasts with the remaining two compensation techniques described below with reference to FIGS. 8 and 9, which actually modify the image data.

Figure 8:
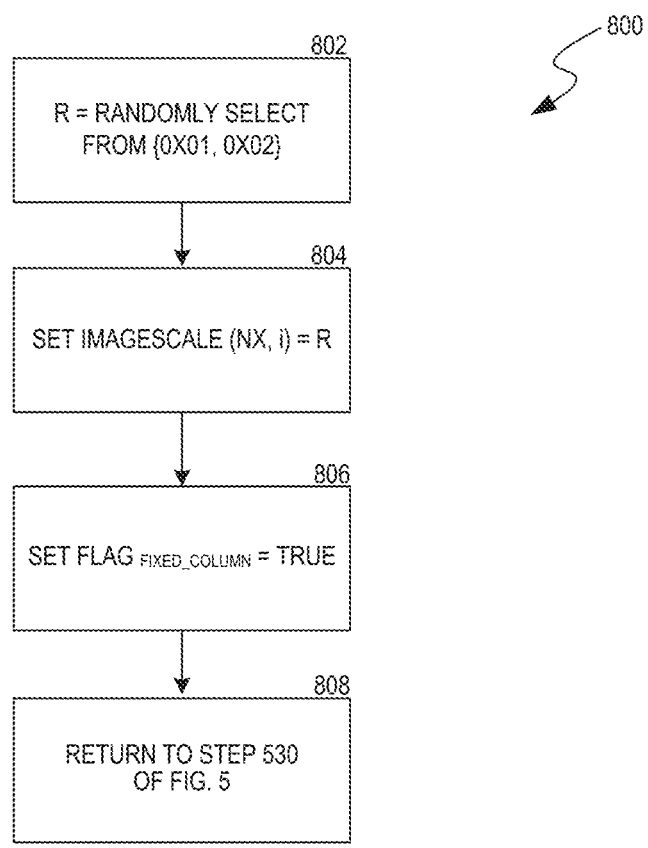
FIG. 8 is a flow diagram illustrating a method for compensating for a defective printer nozzle by modifying image data of an image according to some embodiments of the present disclosure.

FIG. 8 is a flow diagram illustrating a method for compensating for a defective printer nozzle by modifying image data according to some embodiments of the present disclosure. For example, the third tier compensation technique of step 530 can include the method 800 implemented for print modes that use varying amounts of ink such as binary (i.e., black and white) or grayscale print modes.

The printer can compensate for a defective nozzle by setting the ImageScale so that image data that would have been printed in a failed pixel by the defective nozzle is instead printed by a partially complementary nozzles in one or more neighboring pixels. Hence, image data of neighboring pixel(s) is modified with image data of a failed pixel.

For example, in step 802, a number (R) is randomly (or pseudo-randomly) selected. The number R may be used to select a partially complementary nozzle. For example, the number R may be a value (e.g., either 0x01 or 0x02) designating respective partially complementary nozzle. In another example, the number R can range between two boundary values divided by a threshold value used to select a partially complementary nozzle. For example, R can range from 0 to 1 and the threshold value can be 0.5. A first partially complementary nozzle may be selected when R is equal to or less than 0.5, and a second partially complementary nozzle may be selected when R is greater than 0.5.

In step 804, the image data value scheduled in the print mask for printing by the defective nozzle in the ith column is set in the ImageScale for printing by the randomly selected partially complementary nozzle in a neighboring pixel. The pseudo/random selection can yield a uniform appearance for the compensated image. In step 806, the fixed-column flag is set to true, which indicates that further compensation is not necessary to compensate for the defective printer nozzle. Lastly, in step 808, the method returns to step 530 to evaluate the remaining columns of the print mask.

The effectiveness of this compensation technique may depend on the original unmodified image data of the modified pixel. Specifically, in binary or grayscale print modes, the image data of an image pixel is modified by adding ink to a neighboring pixel. However, an image pixel can only be modified with additional ink that would not exceed a maximum value typically associated with such print modes.

For example, in a binary print mode, the image data value of any image pixel is either 0 or 1. If the value of a failed pixel is 1, a neighboring pixel having an original value of 0 would compensate for the failed pixel by having a modified value of 1. However, adding a failed pixel value of 1 to a neighboring pixel having a value of 1 would not compensate for the failed pixel because the value of the modified pixel would be 1+1=2, which exceeds the binary value of 1. Hence, the modified pixel value would have the same unmodified value of 1. Thus, this compensation technique is effective about half the time in a binary print mode.

In a grayscale print mode, the image data value of an image pixel can range up to a maximum value T. The value (M) of a modified neighboring pixel would be the sum the original unmodified value and the value of the failed pixel. Since M cannot exceed T, the actual value of the modified pixel may be reduced to a value equal or less than T. Hence, the effectiveness of this compensation technique depends on the difference between T and M in grayscale print modes.

Figure 9:
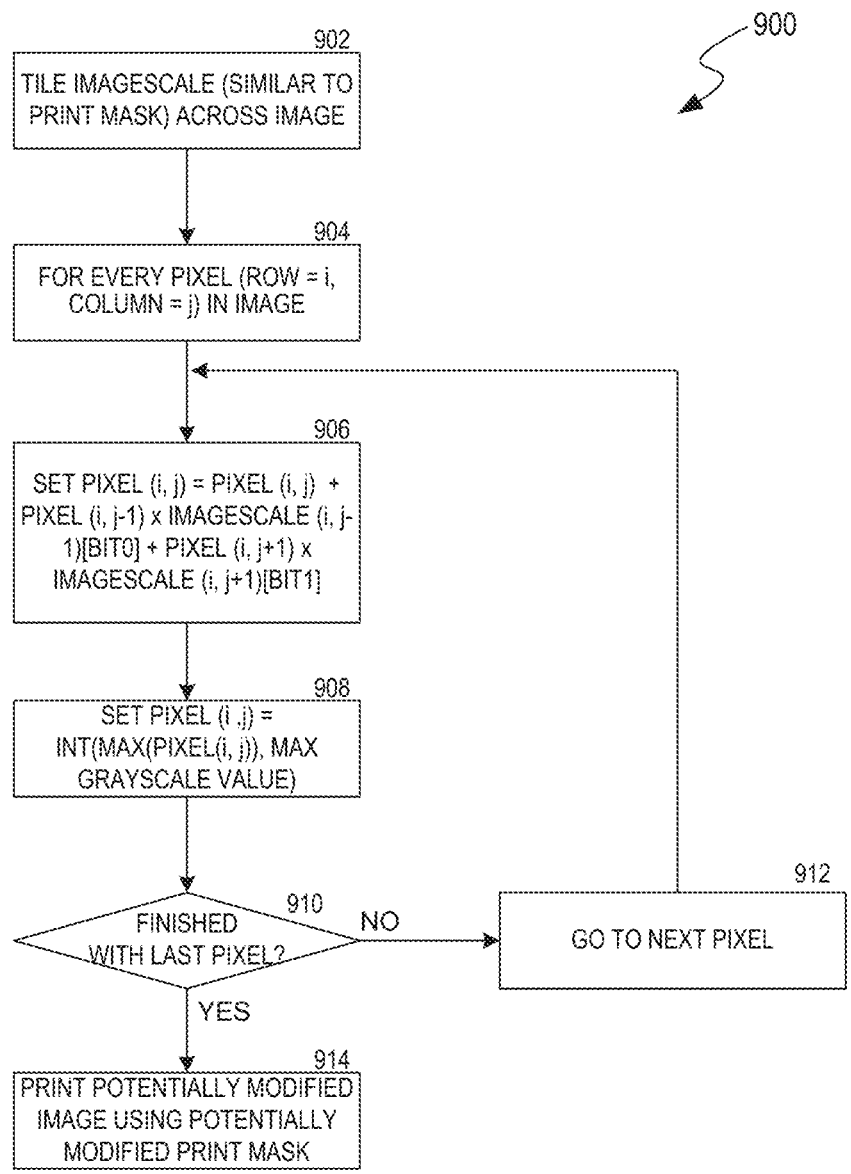
FIG. 9 is a flow diagram illustrating a method for executing a print job according to some embodiments of the present disclosure.

FIG. 9 is a flow diagram illustrating a method for executing a print job according to some embodiments of the present disclosure. The method 900 illustrates an example of the process of step 534 to print a compensated image. In step 902, the ImageScale is tiled across the image of the print job (similar to the print mask) to print the image in accordance with the modified print data.

In step 904, each image pixel of a print job is evaluated iteratively to modify the pixel with corresponding image data indicated in the ImageScale. For example, in step 906, a pixel being evaluated is scaled (e.g., increased) in accordance with the ImageScale. In step 908, the modified image pixel is adjusted to the maximum of the maximum modified value M or maximum threshold value T in a grayscale print mode. In other words, the image value of the modified image pixel is limited to the maximum value available to print that image pixel.

In step 910, a determination about whether there are any remaining image pixels of the image that have not been evaluated is performed. In step 912, if there are remaining image pixels, the method 900 continues by evaluating any next image pixels until there are no remaining image pixels to evaluate. In step 914, if all the image pixels of the image have been evaluated, the modified image is printed using the modified print mask.

Figure 10A:
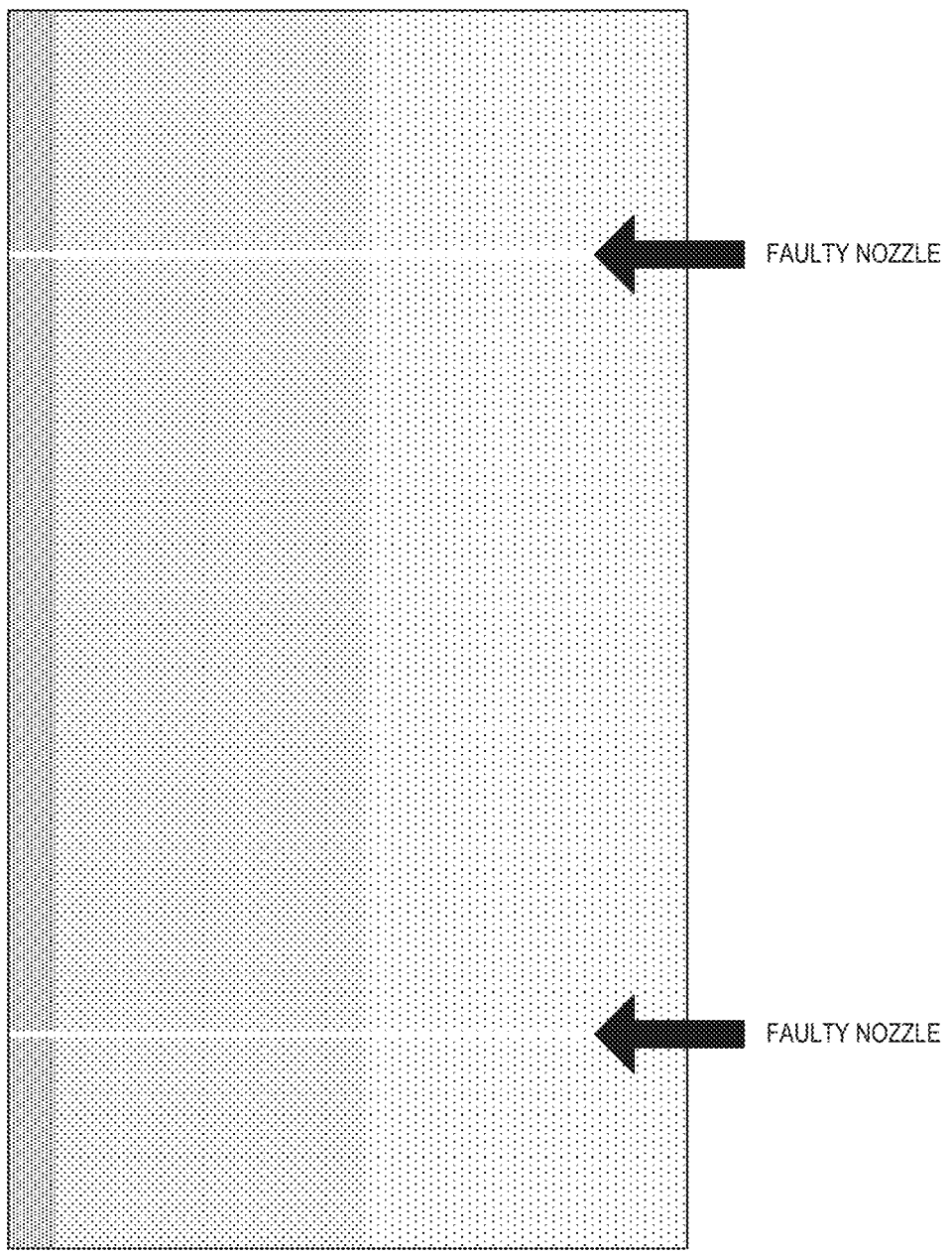
FIG. 10A illustrates a simulation of a defective image printed with nozzles including two failed nozzles according to some embodiments of the present disclosure.
Figure 10B:
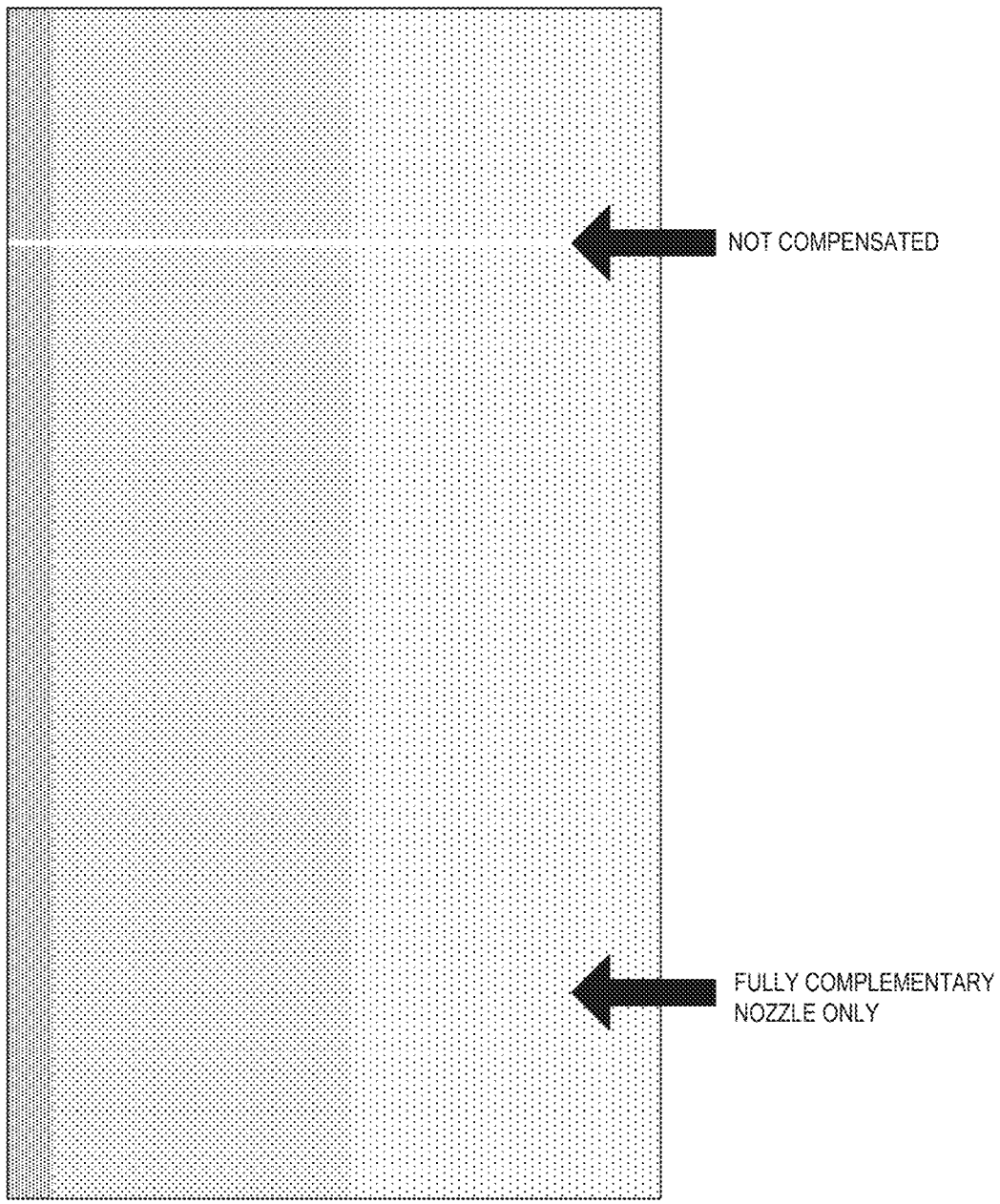
FIG. 10B illustrates a simulation of an image printed by using a first tier compensation that can use fully complementary nozzles to compensate for failed nozzles according to some embodiments of the present disclosure.
Figure 10C:
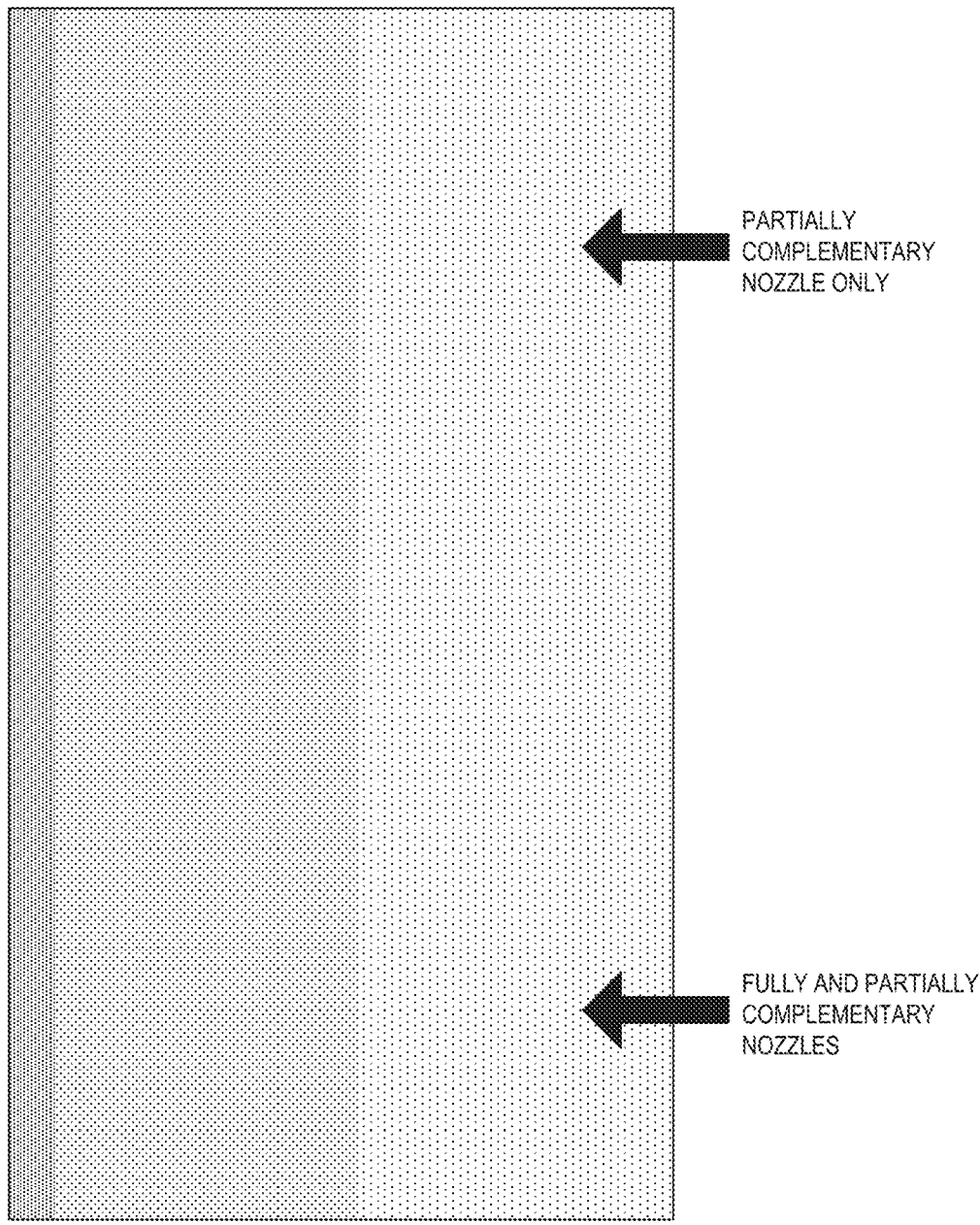
FIG. 10C illustrates a simulation of an image printed by using a second tier compensation, in addition to a first tier compensation, that can use partially complementary nozzles to compensate for failed nozzles according to some embodiments of the present disclosure.

FIG. 10A illustrates a simulation of a defective image printed with nozzles including some defective nozzles. FIG. 10B illustrates an implementation of a first tier compensation to compensate for defective printer nozzles with fully complementary nozzles, where available. FIG. 10C illustrates an implementation of a second tier compensation in addition to a first tier compensation. The second tier compensation can compensate for defective printer nozzles with partially complementary nozzles, where available. The printed images of FIGS. 10A through 10C are simulated by mimicking the behavior of a printer and using optical modeling of resulting dots printed on pixels.

Specifically, FIG. 10A illustrates a simulation of a defective image printed with nozzles that includes two failed nozzles according to some embodiments of the present disclosure. As shown, the printed image is defective because it includes two erroneous horizontal lines of blank pixels. Each horizontal blank line results from a nozzle that failed to eject ink. The image was printed without implementing any compensation.

FIG. 10B illustrates a simulation of an image printed by using a first tier compensation that can use fully complementary nozzles to compensate for failed nozzles according to some embodiments of the present disclosure. Compared to the printed image of FIG. 10A, a fully complementary nozzle is used to compensate for the nozzle responsible for printing the lowermost horizontal blank line. In this case, the failed nozzle responsible for printing the uppermost horizontal blank line does not have a fully complementary nozzle. As such, applying the first tier compensation can compensate for the lowermost horizontal blank line but not the uppermost horizontal blank line.

FIG. 10C illustrates a simulation of an image printed by using a second tier compensation, in addition to the first tier compensation, that can use partially complementary nozzles to compensate for failed nozzles according to some embodiments of the present disclosure. Hence, fully complementary nozzles may compensate some failed nozzles and partially complementary nozzles may compensate for other failed nozzles. Compared to the printed image of FIG. 10B, in addition to the fully complementary nozzle that can compensate for failed nozzle responsible for printing the lowermost horizontal blank line, a partially complementary nozzle can compensate for the failed nozzle responsible for printing the uppermost horizontal blank line. Since the lowermost failed nozzle had been compensated for by a fully complementary nozzle, further compensation of that nozzle with a partially complementary nozzle may be unnecessary and could be avoided to conserve resources. As such, applying the second tier compensation in addition to the first tier compensation can compensate for both the of the erroneous horizontal lines.

FIGS. 10A through 10C are merely examples that illustrate how a combination of compensation techniques can improve the quality of printed images while avoiding disruptions to fix defective printer nozzles. However, the disclosed embodiments are not so limited. For example, the first tier compensation can be used alone when all defective printer nozzles have fully complementary nozzles, or the second tier compensation can be used alone when any defective printer nozzles have partially complementary nozzles. In another example, the second tier compensation may be implemented before or after the first tier compensation is implemented. As such, reference to a "first," "second," or any other numbered tier is meant to distinguish between compensation techniques but does not necessarily suggest an order.

Figure 11:
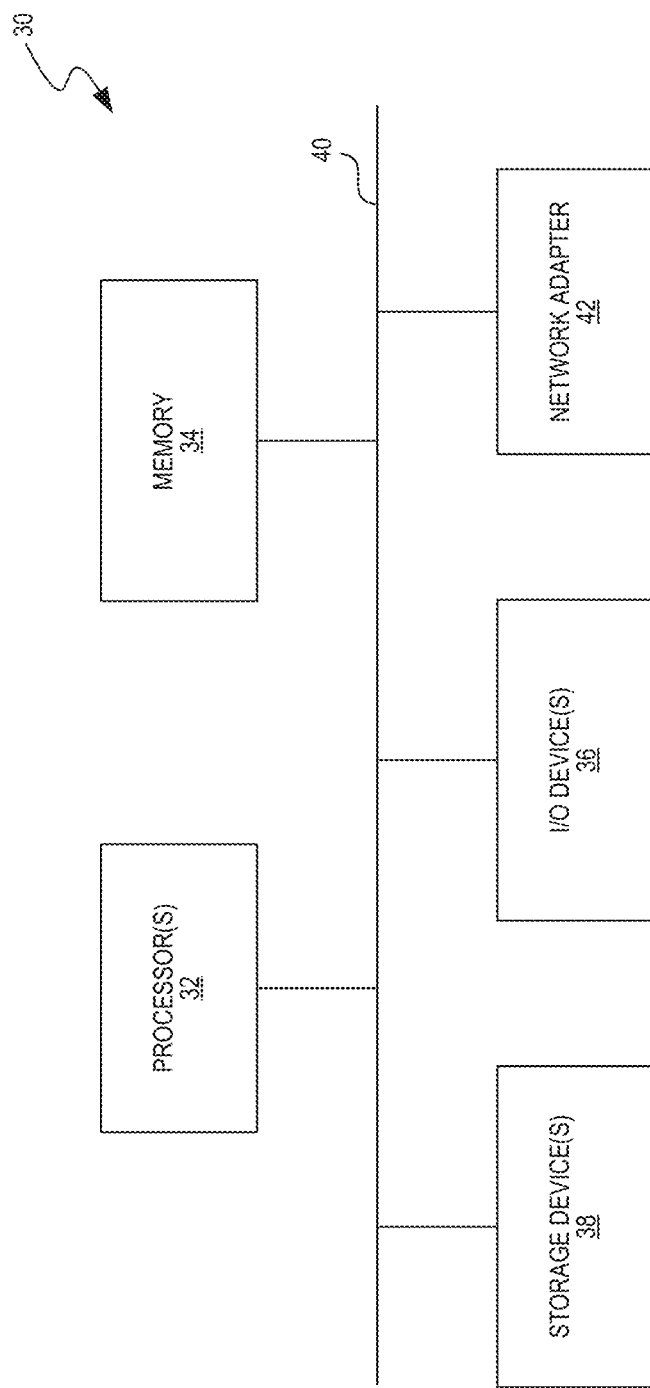
FIG. 11 is a block schematic diagram illustrating a machine in the example form of a computer system within which a set of instructions for causing the machine to perform one or more of the methodologies discussed herein may be executed.

FIG. 11 is a block diagram of a computer system that may be used to implement certain features of some of the disclosed embodiments. The computer system 30 may be or include a printing system including a nozzle manager, a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (handheld) gaming device, a music player, any portable, mobile, hand-held device, wearable device, or any machine capable of executing a set of instructions, sequential or otherwise, that specify actions to be taken by that machine. Any of these devices may be coupled to a shuttle based printer that implemented the disclosed techniques under the control or management of the computer system 30. In some embodiments, the shuttle based printer may include the computer system 30 (e.g., as a control system).

The computer system 30 may include one or more central processing units ("processors") 32, memory 34, input/output devices 36, e.g. keyboard and pointing devices, touch devices, display devices, storage devices 38, e.g. disk drives, and network adapters 43, e.g. network interfaces, that are connected to an interconnect 40.

The interconnect 40 is illustrated as an abstraction that represents any one or more separate physical buses, point-to-point connections, or both connected by appropriate bridges, adapters, or controllers. The interconnect 40, therefore, may include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (2C) bus, or an Institute of Electrical and Electronics Engineers (IEEE) standard 1394 bus, also referred to as Firewire.

The memory 34 and storage devices 38 are computer-readable storage media that may store on-transitory instructions that implement at least portions of the disclosed embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer-readable storage media (e.g., non-transitory media) and computer-readable transmission media.

The instructions stored in memory 34 can be implemented as software and/or firmware to program the processor(s) 32 to carry out the actions described above. In some embodiments, such software or firmware may be initially provided to the processor(s) 32 by downloading it from a remote system through the computing system 40 (via, e.g., a network adapter 42).

The various embodiments disclosed herein can be implemented by, for example, programmable circuitry (e.g., one or more microprocessors) programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the embodiments are described herein with reference to the various features, one skilled in the art will readily appreciate that other applications may be substituted for those set forth herein without departing from the spirit and scope of the present invention. Accordingly, the invention should only be limited by the Claims included below.

I claim:

1. A method for addressing a defective printer nozzle among a plurality of printer nozzles, the method comprising:
   obtaining image data that is to be used to print an image formed of raster rows and raster columns on a medium in accordance with a print mask that maps to defective printer nozzle to a pixel at a first location; and
   modifying the image data such that the pixel is printed by another printer nozzle of the plurality of printer nozzles at a second location that is different than the first location,
   wherein the other printer nozzle is able to eject ink in the same raster rows as the defective printer nozzle but in opposite odd or even positions.

2. The method of claim 1, wherein the second location partially intersects the first location.

3. The method of claim 1, wherein said obtaining comprises:
   receiving the image data from a computer or other host device that is separate from a printer of which the plurality of printer nozzles are a part.

4. The method of claim 1, wherein the plurality of printer nozzles are included in a printhead, and wherein the method further comprises:
   transmitting the modified image data to a memory internal to the printhead, for use by the plurality of printer nozzles in printing the image.

5. The method of claim 1, further comprising:
   causing the image to be printed using the modified image data.

6. The method of claim 1, wherein the other printer nozzle is randomly selected from among one or more printer nozzles, of the plurality of printer nozzles, that are partially complementary to the defective printer nozzle.

7. The method of claim 1, further comprising:
   enumerating a list of fully and partially complementary nozzles for the defective printer nozzle; and
   selecting the other printer nozzle from among the list of fully and partially complementary printer nozzles.

8. The method of claim 1, wherein the pixel is one of a plurality of pixels assigned to the defective printer nozzle in the image data, and wherein each one of the plurality of pixels is assigned to one of the plurality of printer nozzles other than the defective printer nozzle.

9. The method of claim 1, further comprising:
   obtaining a nozzle map with entries corresponding to pixels of the image,
   wherein each of the entries identifies (i) one of the plurality of nozzles that is to deposit ink to form a corresponding one of the pixels and (ii) a pass on which the identified nozzle deposits the ink.

10. The method of claim 9, further comprising:
    identifying the other printer nozzle from among the plurality of printer nozzles through analysis of the nozzle map.

11. The method of claim 10, wherein the other printer nozzle is identified based on a determination that the other printer nozzle is able to deposit ink in the second location on a different pass than the defective printer nozzle would be able to deposit ink in the first location.

* * * * *